US005510187A

United States Patent [19]

Kumar et al.

[11] Patent Number: 5,510,187
[45] Date of Patent: Apr. 23, 1996

[54] MAGNETIC RECORDING MEDIUM WHOSE MAGNETIC LAYER INCORPORATES NONHALOGENATED VINYL COPOLYMER AND SPECIFIED POLYURETHANE POLYMER

[75] Inventors: Ramesh C. Kumar, Maplewood; Ravindra L. Arudi, Woodbury; James G. Carlson, Lake Elmo; Daniel Y. Chang, Vadnais Heights; John C. Haidos, St. Paul; Keith J. Modert, Hugo; Suman K. Patel, Woodbury; Nelson T. Rotto, St. Paul, all of Minn.

[73] Assignee: Minnesota Mining and Manufacturing Company, St. Paul, Minn.

[21] Appl. No.: 457,323

[22] Filed: Jun. 1, 1995

Related U.S. Application Data

[63] Continuation of Ser. No. 54,312, Apr. 27, 1993, abandoned.

[51] Int. Cl.⁶ .................................................. G11B 5/00
[52] U.S. Cl. ...................... 428/425.9; 428/500; 428/522; 428/694 B; 428/694 BU; 428/694 BC; 428/694 BG; 252/62.54
[58] Field of Search ............................. 428/425.9, 500, 428/522, 694 B, 694 BU, 694 BC, 694 BG, 900; 252/62.54

[56] References Cited

U.S. PATENT DOCUMENTS

| | | | |
|---|---|---|---|
| 3,149,996 | 9/1964 | Wagner et al. | 428/694 B |
| 3,542,739 | 11/1970 | Krimm et al. | 260/77.5 |
| 3,607,675 | 9/1971 | Haines | 204/10 |
| 3,843,593 | 10/1974 | Shell et al. | 260/40 |
| 3,929,659 | 12/1975 | Graham | 252/62.54 |
| 3,976,626 | 8/1976 | Turck | 526/78 |
| 4,004,997 | 1/1977 | Tsukamoto et al. | 204/159.14 |
| 4,222,909 | 9/1980 | Brixius et al. | 260/18 |
| 4,244,987 | 1/1981 | Aydia et al. | 427/130 |
| 4,431,769 | 2/1984 | Yoshida et al. | 524/555 |
| 4,690,870 | 9/1987 | Okita et al. | 428/425.9 |
| 4,770,941 | 9/1988 | Imai et al. | 428/411.1 |
| 4,783,370 | 11/1988 | Chernega et al. | 428/425.9 |
| 4,784,913 | 11/1988 | Nakamura et al. | 428/411.1 |
| 4,837,082 | 6/1989 | Harrell et al. | 428/329 |
| 4,861,683 | 8/1989 | Nakachi et al. | 428/694 |
| 4,876,149 | 10/1989 | Ramharack | 428/425.9 |
| 4,900,631 | 2/1990 | Yamakawa et al. | 428/483 |
| 5,008,357 | 4/1991 | Nakachi et al. | 526/292.2 |
| 5,024,892 | 6/1991 | Watanabe et al. | 428/423.1 |
| 5,028,676 | 7/1991 | Nakachi et al. | 526/277 |
| 5,063,119 | 11/1991 | Ishida et al. | 428/694 |
| 5,064,730 | 11/1991 | Takano et al. | 428/694 |
| 5,068,258 | 11/1991 | Noguchi | 522/31 |
| 5,081,213 | 1/1992 | Carlson | 528/73 |
| 5,098,783 | 3/1992 | Watanabe et al. | 428/323 |
| 5,126,202 | 6/1992 | Inaba et al. | 428/402 |
| 5,132,383 | 7/1992 | Larson et al. | 526/292.2 |
| 5,139,892 | 8/1992 | Nakachi et al. | 428/694 |
| 5,153,053 | 10/1992 | Hashimoto et al. | 428/215 |
| 5,268,407 | 12/1993 | Hayashi et al. | 524/398 |
| 5,320,914 | 6/1994 | Nakamura et al. | 428/694 |

FOREIGN PATENT DOCUMENTS

| | | |
|---|---|---|
| 0123576 | 10/1984 | European Pat. Off. . |
| 0326864 | 8/1989 | European Pat. Off. . |
| 53-015219 | 2/1978 | Japan . |
| 54-46518 | 4/1979 | Japan . |
| 54-46519 | 4/1979 | Japan . |
| 54-84708 | 5/1979 | Japan . |
| 55-15281 | 2/1980 | Japan . |
| 55-15278 | 2/1980 | Japan . |
| 55-15279 | 2/1980 | Japan . |
| 57-6437 | 1/1982 | Japan . |
| 57-141020 | 9/1982 | Japan . |
| 59-219304 | 12/1984 | Japan . |
| 60-182017 | 9/1985 | Japan . |
| 61-026132 | 2/1986 | Japan . |
| 62-30162 | 2/1987 | Japan . |
| 62-73417 | 4/1987 | Japan . |
| 63-112820 | 5/1988 | Japan . |
| 2-077415 | 3/1990 | Japan . |
| 2-208310 | 8/1990 | Japan . |
| 61-59623 | 11/1992 | Japan . |
| 1574721 | 9/1980 | United Kingdom . |

OTHER PUBLICATIONS

Polym. Prep. (ACS Div. Polym. Chem.) 24(2), 126–9 (1983).
Brochure, CPS Chemical Company, Inc., Amine and Quaternary Monomers No Publication Date.
Brochure, Sekisui Chemical Co., Ltd., Chemical Specialty, Polyvinyl Acetal Resins, etc. (Jul. 1992) No Publication Date.

*Primary Examiner*—Stevan A. Resan
*Attorney, Agent, or Firm*—Gary L. Griswold; Walter N. Kirn; David B. Kagan

[57] ABSTRACT

Magnetic recording medium, comprising a magnetic layer provided on a nonmagnetizable substrate, wherein the magnetic layer comprises a magnetic pigment dispersed in a polymeric binder. The polymeric binder comprises a nonhalogenated vinyl copolymer, wherein the vinyl copolymer comprises a plurality of pendant nitrile groups, a plurality of pendant hydroxyl groups, and at least one pendant dispersing group. Preferably, the binder also includes a secondary polymer component.

51 Claims, No Drawings

MAGNETIC RECORDING MEDIUM WHOSE MAGNETIC LAYER INCORPORATES NONHALOGENATED VINYL COPOLYMER AND SPECIFIED POLYURETHANE POLYMER

This is a continuation of application Ser. No. 08/054,312 filed Apr. 27, 1993 now abandoned.

FIELD OF THE INVENTION

The present invention relates to magnetic recording media, and more particularly to magnetic recording media whose magnetic layers contain a nonhalogenated vinyl copolymer with pendant nitrile groups, pendant hydroxyl groups, and a pendant dispersing group. The present invention also relates to such a vinyl copolymer itself.

BACKGROUND OF THE INVENTION

Magnetic recording media generally comprise a magnetic layer coated onto at least one side of a nonmagnetizable substrate. For particulate magnetic recording media, the magnetic layer comprises a magnetic pigment dispersed in a polymeric binder. The magnetic layer may also include other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

Some forms of magnetic recording media, such as magnetic recording tape, may also have a backside coating applied to the other side of the nonmagnetizable substrate in order to improve the durability, conductivity, and tracking characteristics of the media. The backside coating also includes a polymeric binder and other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

The polymeric binders of the magnetic layer and the backside coating are commonly derived from polymers which require curing in order to provide magnetic recording media with appropriate physical and electromagnetic properties. To prepare such media, the components of the magnetic layer or the backside coating, as appropriate, are combined with a suitable solvent and thoroughly mixed to form a homogeneous dispersion. The resulting dispersion is then coated onto the nonmagnetizable substrate, after which the coating is dried, calendered if desired, and then cured.

The polymeric binders of magnetic recording media are most commonly prepared from polymer blends comprising a hard component, i.e., a polymer with relatively high glass transition temperature and modulus, and a soft component, i.e. a polymer with relatively low glass transition temperature and modulus. In the past, polyurethane polymers have been widely used as the soft component.

Copolymers based on vinyl chloride or vinylidene chloride have been widely used as the hard component of choice for use with polyurethanes, due to their miscibility and compatibility with polyurethanes and their relatively high glass transition temperatures, modulii, and hardness. For example, Japanese Publication No. JP61-26132 describes the use of vinyl chloride/vinyl acetate/vinyl alcohol copolymers as a polymeric binder component in magnetic recording media.

Magnetic pigments tend to agglomerate and can be difficult to initially disperse in the polymeric binder or be difficult to keep dispersed in the polymeric binder over time. Low molecular weight wetting agents, or dispersants, are often employed to facilitate such dispersion. For higher pigment loadings, i.e., the use of greater amounts by weight of magnetic pigment, greater amounts of wetting agent or dispersant may be required. This is not always desirable. Dispersants tend to plasticize binder systems and decrease their modulus. Further, excess dispersant may exude from a cured binder system over time, leading to changes in the properties of the media as well as to contamination of a recording head or the like.

To help alleviate the problems associated with added low molecular weight dispersants or wetting agents, polymeric binders formed from "self-wetting" polymers have been developed. "Self-wetting" polymers have dispersing groups pendant from the polymer backbone that help disperse the magnetic pigment. Representative examples of dispersing groups include quaternary ammonium, amine, heterocyclic moieties, salts or acids based on sulfate, salts or acids based on sulfonate, salts or acids based on phosphate, salts or acids based on phosphonate, salts or acids based on carboxyl, mixtures thereof, and the like. As a result of using self-wetting polymers, less low molecular weight dispersant or wetting agent, or even no low molecular weight dispersant or wetting agent, may be needed to disperse the magnetic and nonmagnetic (if any) pigments in the polymeric binder. Self-wetting vinyl chloride copolymers have been described. See, e.g., U.S. Pat. Nos. 5,139,892; 5,126,202; 5,098,783; 5,064,730; 5,028,676; 5,008,357; 4,861,683; 4,784,913; 4,770,941; and 4,244,987.

Vinyl chloride or vinylidene chloride copolymers, however, tend to degrade over time, releasing gaseous HCl which can change the properties of the media as well as corrode the recording head or the like. Accordingly, some investigators have described vinyl copolymers used in magnetic recording media, wherein the use of vinyl chloride and vinylidene chloride has been avoided. See, e.g., U.S. Pat. Nos. 5,098,783; 4,876,149; and 4,837,082; and Japanese Publication Nos. SHO 62-0162; SHO 54-84708; SHO 54-46519; and SHO 54-46518.

What is still needed in the art, however, is a hard component for use in magnetic recording media which imparts high modulus and high resilience to magnetic recording media, but which does not contain any vinyl chloride or vinylidene chloride components.

SUMMARY OF THE INVENTION

We have now developed a magnetic recording medium whose polymeric binder system contains a polyurethane-compatible hard component having no vinyl chloride or vinylidene chloride constituents. In one aspect, the present invention concerns a nonhalogenated vinyl copolymer, wherein the vinyl copolymer comprises a plurality of pendant nitrile groups, a plurality of pendant hydroxyl groups, and at least one pendant dispersing group.

In another aspect, the present invention concerns a magnetic recording medium. The magnetic recording medium comprises a magnetic layer provided on a nonmagnetizable substrate. The magnetic layer comprises a magnetic pigment dispersed in a polymeric binder. The polymeric binder comprises a nonhalogenated, vinyl copolymer as described above and a secondary polymer component.

In one preferred embodiment of the present invention, the secondary polymer component is a polyurethane polymer, wherein the polyurethane polymer comprises a pendant dispersing moiety of the formula

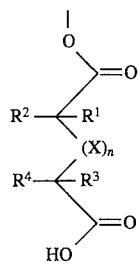

wherein

R¹ R² R³ and R⁴ are independently selected from the group consisting of —H, —OH, —COOM, —SO₃M, —SH, —CH₂COOM, —SCH₂COOM, —P(=O)(OM)₂, —OP(=O)(OM)₂, and —Y, wherein at least one of R¹, R², R³, and R⁴ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, H⁺ and ammonium cations;

R¹ and R² together or R³ and R⁴ together can be cis or trans =CHCOOH;

X is a divalent moiety independently selected from the group consisting of —CR⁵R⁶ and —NR⁷;

n represents an integer selected from the group consisting of 0 and 1;

R⁵ and R⁶ are independently selected from the group consisting of —H, —OH, —COOM, —SO₃M, —SH, —CH₂COOM, —SCH₂COOM, —P(=O)(OM)₂, —OP(=O)(OM)₂, and —Y, wherein M and Y are as defined above;

R⁷ is a monovalent moiety independently selected from the group consisting of —CH₂COOH, —CH₂CH₂COOH, —CH₂CH₂N(CH₂COOH)₂, —(CH₂)₆N(CH₂COOH)₂, —(CH₂CH₂O)₂CH₂CH₂N(CH₂COOH)₂, and —CH₂CH₂N(CH₂COOH)CH₂CH₂OH.

In another preferred embodiment, the secondary polymer component is a polyurethane polymer having at least one pendant nonhalogenated vinyl copolymeric moiety, said vinyl copolymeric moiety of the polyurethane polymer comprising a plurality of pendant nitrile groups.

As used throughout this specification, the term "nonhalogenated" means that the copolymer contains no covalently bound halogen atoms. Thus, the term "nonhalogenated" excludes vinyl halide monomers such as vinyl chloride or vinylidene chloride as monomeric components of the copolymer, but the term "nonhalogenated" does not exclude monomeric components such as (meth)acryloyloxyethyl trimethylammonium chloride in which chlorine is present as a chloride anion.

The term "vinyl" with respect to a polymeric material means that the material comprises repeating units derived from vinyl monomers. As used with respect to a vinyl monomer, the term "vinyl" means that the monomer contains a moiety having a free-radically polymerizable carbon-carbon double bond. Monomers having such moieties are capable of copolymerization with each other via the carbon-carbon double bonds.

The term "immiscible" with respect to two polymers means that a blend of just the two materials shows two glass transition temperatures ("$T_g$'s") using differential scanning calorimetry ("DSC") techniques when the blend is substantially free of solvent. The term "miscible", on the other hand, means that a blend of the two materials shows a single $T_g$ using DSC techniques when substantially free of solvent.

Throughout this specification, the prefix "(meth)acryl-" means "methacryl-" or "acryl-".

DESCRIPTION OF THE PREFERRED EMBODIMENTS

Magnetic recording media of the present invention comprise a magnetic layer provided on a nonmagnetizable substrate. The particular nonmagnetizable substrate of the present invention may be formed from any suitable substrate material known in the art. Examples of suitable substrate materials include, for example, polymers such as polyethylene terephthalate ("PET"), polyimide, and polyethylene naphthalene ("PEN"); metals such as aluminum, or copper; paper; or any other suitable material.

The components of the magnetic layer comprise a magnetic pigment dispersed in a polymeric binder. Typically, the magnetic layer may contain 100 parts by weight of the magnetic pigment and 5 to 40 parts by weight of the polymeric binder. The type of magnetic pigment used in the present invention may include any suitable magnetic pigment known in the art including $\gamma\text{-Fe}_2O_3$, cobalt-doped $\gamma\text{-Fe}_2O_3$, $Fe_3O_4$, $CrO_2$, barium ferrite, barium ferrite derivatives, metal particles, and the like.

The polymeric binder of the present invention includes a nonhalogenated vinyl copolymer having a plurality of pendant nitrile groups. Without wishing to be bound by theory, we believe that the nitrile groups may enhance the ability of the vinyl copolymer to interact strongly with the magnetic pigment, thereby facilitating dispersion of the magnetic pigment in the polymeric binder. We also believe that the nitrile group may promote the compatibility of these vinyl copolymers with polyurethanes. In order to provide a vinyl copolymer having pendant nitrile groups, one or more nitrile functional, nonhalogenated vinyl monomers may be incorporated into the vinyl copolymer. Representative examples of such monomers include (meth)acrylonitrile, β-cyanoethyl-(meth)acrylate, 2-cyanoethoxyethyl (meth)acrylate, p-cyanostyrene, p-(cyanomethyl)styrene, and the like. Preferably, the nitrile functional, nonhalogenated vinyl monomer is (meth)acrylonitrile, and more preferably acrylonitrile.

The vinyl copolymer of the present invention also contains pendant hydroxyl groups and at least one pendant dispersing group. The pendant hydroxyl groups of the vinyl copolymer not only facilitate dispersion of the magnetic pigment in the polymeric binder, but also promote solubility, cure, and compatibility with other polymers. The hydroxyl groups may be primary, secondary, or tertiary, although primary and secondary hydroxyl groups are preferred. Generally, preferred vinyl copolymers of the present invention have a hydroxyl equivalent weight in the range from about 300 to about 10,000, preferably 500 to 5000, more preferably 800 to 1500.

In order to provide a vinyl copolymer having a plurality of pendant hydroxyl groups, one or more nonhalogenated, hydroxyl functional, vinyl monomers may be incorporated into the vinyl copolymer. Representative examples of suitable nonhalogenated, hydroxyl functional, vinyl monomers include an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene; or the like. Preferably, the nonhalogenated, hydroxyl functional, vinyl monomer is selected from 2-hydroxyethyl (meth)acrylate, 2-hydroxypropyl (meth)acrylate, and mixtures thereof. Alternatively, vinyl copolymers with pendant hydroxyl groups can also be prepared by incorporating vinyl acetate into the vinyl copolymer and then partially or fully hydrolyzing the acetate moieties to produce hydroxyl groups.

The dispersing group, if any, of the vinyl copolymer facilitates dispersion of the magnetic pigment in the polymeric binder. In those instances wherein the vinyl copolymer includes more than one dispersing group, the dispersing groups may be the same, or they may be different. It is desirable that the vinyl copolymer have a dispersing group equivalent weight in the range from about 2000 to about 100,000, preferably about 5000 to about 50,000.

As used throughout this specification, the term "dispersing group" means that a group is capable of wetting the magnetic pigment. Preferably, the term "dispersing group" means a group that is ionized or ionizable at a pH in the range from 2 to 10. Representative examples of suitable dispersing groups include quaternary ammonium moieties (e.g., $—N(CH_3)_3^+Cl^-$ as one example), amines (e.g., $—N(CH_3)_2$ as one example), heterocyclic moieties as described in U.S. Pat. No. 5,081,213, sulfobetaines (e.g., $—N^+(CH_3)_2(CH_2CH_2CH_2SO_3^-)$), salts or acids based on sulfate (e.g., $—OSO_3$ Na as one example), salts or acids based on sulfonate (e.g., $—SO_3Na$ as one example), salts or acids based on phosphate (e.g., $—OPO(OH)_2$ as one example), salts or acids based on phosphonate (e.g., $—PO(OH)_2$ as one example), salts or acids based on carboxyl (e.g., $—COONa$ as one example), mixtures thereof, and the like.

One or more dispersing groups can be introduced into the vinyl copolymer in a variety of ways. As one approach, dispersing initiators may be used. Dispersing initiators initiate copolymerization of vinyl monomers to provide vinyl copolymers with terminal dispersing groups. Examples of suitable dispersing initiators include 4,4'-azobis (cyanovaleric acid), succinic acid peroxide, potassium persulfate, and sodium perphosphate. Another approach for introducing the dispersing group into the vinyl copolymer is to use a functional chain transfer agent such as mercaptosuccinic acid during copolymerization of the vinyl monomers.

The dispersing group may also be introduced into the vinyl copolymer through the use of a nonhalogenated, vinyl monomer bearing a dispersing group. Representative examples of suitable nonhalogenated, vinyl monomers bearing a dispersing group include (meth)acryloyloxyethyl trimethyl ammonium chloride, (meth)acryloyloxyethyl acid phosphate, (meth)acrylamidopropyl trimethylammonium chloride, (meth)acryloyloxypropyl dimethylbenzylammonium chloride, vinylbenzyl trimethylammonium chloride, 2-hydroxy-3-allyloxypropyl trimethylammonium chloride, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, dimethylaminoethyl (meth)acrylate, maleic anhydride, N-(3-sulfopropyl)-N-(meth)acryloyloxyethyl-N,N-dimethylammonium betaine, 2-[(meth)acryloyloxy]ethyl trimethylammonium methosulfate, N-(3-sulfopropyl)-N-(meth)acrylamidopropyl-N,N-dimethylammonium betaine, vinylbenzyl trimethylammonium chloride, mixtures thereof, and the like.

A dispersing group may also be introduced into the vinyl copolymer using suitable polymer reactions. Examples of suitable polymer reactions to provide the dispersing group include: (1) reaction of succinic anhydride with a portion of the hydroxyl groups on a vinyl copolymer to produce a vinyl copolymer with pendant acid functionality; and (2) reaction of a tertiary amine with the epoxy groups on a vinyl copolymer to produce a vinyl copolymer with pendant quaternary ammonium groups. In order to provide a vinyl copolymer having a pendant epoxy groups for this reaction, nonhalogenated, epoxy functional vinyl monomers may be incorporated into the vinyl copolymer. Such monomers include, for example, glycidyl ether of an unsaturated alcohol such as allyl glycidyl ether, a glycidyl ester such as glycidyl (meth)acrylate, and the like.

Preferred vinyl copolymers of the present invention are copolymers of monomers comprising (meth)acrylonitrile; a nonhalogenated, hydroxyl functional, vinyl monomer as described above; a nonhalogenated, vinyl monomer bearing a dispersing group as described above; and one or more nonhalogenated, nondispersing, vinyl monomers. The term "nondispersing" means that the monomer bears no dispersing group and no hydroxyl group.

Representative examples of suitable copolymerizable, nonhalogenated, nondispersing, vinyl monomers include styrene; alkylated styrenes; alkoxy styrenes; vinyl naphthalene; alkylated vinyl naphthalenes; alkoxy vinyl naphthalenes; (meth)acrylamides; N-vinyl pyrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or alicyclic; isobornyl (meth)acrylate; glycidyl (meth)acrylate vinyl acetate; allyl (meth)acrylate, and the like. Preferred nonhalogenated, nondispersing, vinyl monomers include styrene, alkyl-substituted styrenes, alkyl (meth)acrylates wherein the alkyl group contains 1 to 4 carbon atoms, and mixtures thereof. Most preferably, the nonhalogenated, nondispersing, vinyl monomer is selected from styrene, methyl methacrylate, ethyl methacrylate, and mixtures thereof.

One particularly preferred nonhalogenated vinyl copolymer of the present invention (hereinafter referred to as the "Preferred Vinyl Copolymer") is a nonhalogenated vinyl copolymer of monomers comprising 5 to 40, preferably 15 to 40, parts by weight of (meth)acrylonitrile; 30 to 80 parts by weight of one or more nonhalogenated, nondispersing, vinyl monomers; 5 to 30 parts by weight of a nonhalogenated, hydroxyl functional, vinyl monomer; and 0.25 to 10, preferably 0.25 to 5, most preferably 0.5 to 2 parts by weight of a nonhalogenated, vinyl monomer bearing a dispersing group.

For the Preferred Vinyl Copolymer, the dispersing group is preferably selected from quaternary ammonium, acid or salt of carboxyl, acid or salt of phosphate or phosphonate, acid or salt of sulfate or sulfonate, and mixtures thereof. More preferably, the dispersing group is quaternary ammonium. When the dispersing group is quaternary ammonium, it is preferred that the vinyl monomer bearing a dispersing group is (meth)acryloyloxyethyl trimethylammonium chloride.

Preferably, the nonhalogenated, nondispersing, vinyl monomer of the Preferred Vinyl Copolymer is selected from styrene; an alkyl ester of (meth)acrylic acid wherein the alkyl group of the alkyl ester has 1 to 20 carbon atoms; and a blend comprising styrene and such an alkyl ester wherein the weight ratio of styrene to the alkyl ester is in the range from 10:90 to 90:10. For Preferred Vinyl Copolymers containing such an alkyl ester, the alkyl ester is preferably methyl (meth)acrylate, more preferably methyl methacrylate.

Nonhalogenated vinyl copolymers of the present invention may be prepared by free-radical polymerization methods known in the art, including but not limited to bulk, solution, emulsion and suspension polymerization methods. For example, according to the solution polymerization method, copolymers of the present invention are prepared by dissolving the desired monomers in an appropriate solvent, adding a chain-transfer agent, a free-radical polymerization initiator, and other additives known in the art, sealing the solution in an inert atmosphere such as nitrogen or argon, and then agitating the mixture at a temperature sufficient to activate the initiator.

Solvents useful in such polymerizations can vary according to solubility of the monomers and additives. Typical solvents include ketones such as acetone, methyl ethyl ketone, 3-pentanone, methyl isobutyl ketone, diisobutyl ketone, and cyclohexanone; alcohols such as methanol, ethanol, propanol, n-butanol, isopropanol, isobutanol, cyclohexanol and methyl cyclohexanol; esters such as ethyl acetate, butyl acetate, isobutyl acetate, isopropyl acetate, and the like; aromatic hydrocarbons such as benzene, toluene, xylenes, cresol, and the like; ethers such as diisopropyl ether, diisobutyl ether, tetrahydrofuran, tetrahydropyran, and dioxane; and aprotic solvents such as dimethylformamide, dimethylsulfoxide and the like, and mixtures thereof. The preferred solvent for preparation of the vinyl copolymers of the present invention is methyl ethyl ketone (MEK) because it is also the preferred medium in which the magnetic dispersions, described below, are prepared due to the ready solubility therein of polyurethane-vinyl copolymer blends.

Chain transfer agents suitable for solution polymerization include but are not limited to alcohols, mercaptans, certain halogenated small molecules, and mixtures thereof. Preferably, the chain transfer agent is chosen from the group consisting of carbon tetrabromide, isooctylthioglycolate, mercaptosuccinic acid, mercaptopropane diol, dodecyl mercaptan, ethanol and carbon tetrachloride. Most preferably, the chain transfer agent is mercaptopropane diol.

Free-radical polymerization initiators suitable for solution polymerization include those that are soluble in the reaction solvent and that are thermally activated, including but not limited to azo compounds, peroxides, and mixtures thereof. Useful peroxide initiators include those chosen from the group consisting of benzoyl peroxide, lauroyl peroxide, di-t-butyl peroxide and the like, and mixtures thereof. Useful azo compound initiators include those chosen from the group consisting of 2,2,-azobis(2-methylbutyronitrile); 2,2,'-azobis(isobutyronitrile); and 2,2'-azobis(2,4-dimethylpentanenitrile); each of which is commercially available as VAZO 67, VAZO 64, and VAZO 52, respectively, from E. I. Du Pont de Nemours and Co. The preferred thermal polymerization initiator is the VAZO 64 brand initiator because of its ease of use and its half-life characteristics (e.g., at 64° C., half-life is 10 hours).

Nonhalogenated vinyl copolymers of the present invention may also be prepared by emulsion polymerization methods. Typically, an emulsion comprising vinyl monomers, a chain-transfer agent and a water-soluble redox-type initiator system is prepared in an inert atmosphere, then heated carefully until a reaction exotherm occurs. The reaction mixture is stirred and cooled and the resulting latex is collected. Optionally, an ionic or nonionic surfactant may be added to the reaction mixture. Oxidation—reduction ("Redox") free-radical initiators useful in the invention include but are not limited to those chosen from the group consisting of tertiary amines with organic peroxides (exemplified by the N, N-diethylaniline—benzoyl peroxide pair); organic halides with transition metal complexes (exemplified by the carbon tetrachloride—molybdenum hexacarbonyl pair); inorganic oxidation—reduction systems (exemplified by the potassium persulfate—sodium metabisulfite pair); and organic—inorganic systems (exemplified by the 2-mercaptoethanol— $Fe^{+3}$ pair). Inorganic redox initiators are preferred for the copolymers of the invention because of their ease of handling and useful reaction temperature range.

In addition to the nonhalogenated vinyl copolymer, the polymeric binder of the present invention may also include a secondary polymer component. The secondary polymer component of the present invention may be any polymer, or combination of polymers, known in the art to be suitable as a binder material for magnetic recording media. Examples of polymers suitable for use as the secondary polymer component include thermoplastic or thermosetting polyurethanes, polyureas, nitrocellulose polymers, phenoxy resins, combinations of such polymers, and the like. Preferably, the weight ratio of the nonhalogenated vinyl copolymer to the secondary polymer component is in the range from about 1:19 to 19:1, preferably 1:5 to 5:1, and more preferably 4:6 to 6:4.

In preferred embodiments, the secondary polymer component is a polyurethane polymer. Representative examples of suitable polyurethane polymers include polyester polyurethanes, polyether polyurethanes, polyether polyester polyurethanes, polycarbonate polyurethanes, polyester polycarbonate polyurethanes, polycaprolactone polyurethanes, mixtures thereof, and the like.

Generally, except for the polyurethanes having a pendant nonhalogenated, vinyl copolymeric moiety as described below, the nonhalogenated vinyl copolymers of the present invention and polyurethanes tend to be immiscible inasmuch as blends of these materials generally show two distinct glass transition temperatures using differential scanning calorimetry techniques. Notwithstanding their immiscibility, blends of polyurethanes with the nonhalogenated vinyl copolymers of the present invention provide magnetic layers with good mechanical and electromagnetic performance. Indeed, our experiments have shown that the durability and modulus characteristics of magnetic layers of the present invention are as good as, if not better than, the performance offered by vinyl chloride copolymer/polyurethane systems of the prior art. The mechanical and electromagnetic properties of magnetic layers of the present invention are also extremely stable over time. Moreover, our experiments have shown that magnetic layers of the present invention shed substantially less undesirable adherent, or "sticky", debris than similar systems incorporating vinyl chloride copolymers such as EC-130™ vinyl chloride copolymer or VAGH™ vinyl chloride copolymer.

For example, all magnetic recording media tend to produce debris to some extent. Vinyl chloride copolymers of the prior art result in coatings which produce sticky debris. Such debris can stick to the heads or drive components or can transfer back onto the tape. In contrast, vinyl copolymers of the present invention produce nonsticky debris which tends to be loose and dry. Such debris is not problematic because it does not stick to anything or transfer back onto the media.

As another advantage, in embodiments of the present invention incorporating two-phase vinyl copolymer/polyurethane systems, the glass transition temperature of the vinyl copolymer is not reduced by the presence of the polyurethane. As a result, the vinyl copolymer maintains higher modulus and higher thermal stability at elevated temperatures than if the vinyl copolymer were to be miscible with the polyurethane.

As an option, the polyurethane polymer, or any other polymer of the secondary polymer component, may contain one or more pendant functional groups to enhance the performance of the magnetic recording medium. For example, the polyurethane polymer or other polymers of the secondary polymer component may contain carbon-carbon double bonds and/or hydroxy groups to facilitate crosslinking of the secondary polymer component if desired. As other examples of pendant functional groups, the polyurethane or other polymers of the secondary polymer component may contain pendant dispersing groups in order to facilitate dispersion of the magnetic pigment in the polymeric binder. In one preferred embodiment, the polyurethane polymer bears pendant hydroxyl groups and at least one pendant dispersing group. In another preferred embodiment, the polyurethane polymer bears pendant hydroxyl groups, at least one pendant dispersing group, and at least one pendant radiation curable moiety.

Preferred polyurethane polymers of the present invention are generally polymers of one or more polyisocyanates and one or more polyols, Wherein the hydroxyl groups of the polyol(s) are in excess relative to the NCO moieties of the polyisocyanate(s). As used throughout this specification, the term "polyisocyanate" means one or more organic compounds that have two or more pendant NCO moieties on a single molecule. In the practice of the present invention, a polyisocyanate may be linear or branched aliphatic, alicyclic, aromatic, or the like. This definition of polyisocyanate includes diisocyanates, triisocyanates, tetraisocyanates, and mixtures thereof. Preferably, the polyisocyanate is one or more diisocyanates. Examples of suitable diisocyanates include diphenylmethane diisocyanate, isophorone diisocyanate, toluene diisocyanate, hexamethylene diisocyanate, tetramethylxylene diisocyanate, p-phenylene diisocyanate, mixtures thereof, and the like.

As used throughout this specification, the term "polyol" means one or more alcohols containing two or more hydroxyl groups per molecule, including diols, triols, tetrols, mixtures thereof, and the like. Various kinds of specific polyols can be incorporated into the polyurethane in order to improve the polyurethane's compatibility with the vinyl copolymer. For example, short chain diols, i.e., diols having a molecular weight up to about 300, may be used to increase the hardness and urethane content of the resulting polyurethane. We have found that increasing the urethane content of a polyurethane improves its compatibility with the vinyl copolymer. Representative examples of short chain diols include ethylene glycol, propylene glycol, 1,3-propane diol, 1,4-butane diol, 1,5-pentane diol, 1,6-hexane diol, neopentyl glycol, diethylene glycol, dipropylene glycol, 2,2,4-trimethyl-1,3-pentane diol, 1,4-cyclohexane dimethanol, ethylene oxide and/or propylene oxide adduct of bisphenol A, ethylene oxide and/or propylene oxide adduct of hydrogenated bisphenol A, mixtures thereof, and the like.

As another example of using specific polyols to improve the compatibility of the polyurethane with the vinyl copolymer, diols or triols incorporating caprolactone may also be incorporated into the polyurethane. Such polycaprolactone polyols are unique because such materials have both polar and nonpolar characteristics. Representative examples of specific polycaprolactone diols and triols include TONE 0210™ polycaprolactone diol (OH equivalent weight of about 415) and TONE 0305™ polycaprolactone triol (OH equivalent weight of about 180) commercially available from Union Carbide Corp.

One example of a particularly preferred polyurethane (hereinafter referred to as the "Half-ester Polyurethane") for use in the practice of the present invention is a polyurethane comprising a pendant dispersing moiety of the formula

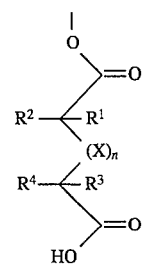

wherein $R^1$, $R^2$, $R^3$, and $R^4$ are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein at least one of $R^1$, $R^2$, $R^3$, and $R^4$ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, H$^+$ and ammonium cations;

$R^1$ and $R^2$ together or $R^3$ and $R^4$ together can be cis or trans =CHCOOH;

X is a divalent moiety independently selected from the group consisting of —CR$^5$R$^6$ and —NR$^7$;

n represents an integer selected from the group consisting of 0 and 1;

$R^5$ and $R^6$ are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein M and Y are as defined above;

$R^7$ is a monovalent moiety independently selected from the group consisting of —CH$_2$COOH, —CH$_2$CH$_2$COOH, —CH$_2$CH$_2$N(CH$_2$COOH)$_2$, —(CH$_2$)$_6$N(CH$_2$COOH)$_2$, —(CH$_2$CH$_2$O)$_2$CH$_2$CH$_2$N(CH$_2$COOH)$_2$, and —CH$_2$CH$_2$N(CH$_2$COOH)CH$_2$CH$_2$OH.

Preferably $R^1$, $R^2$, $R^3$, $R^4$, $R^5$, and $R^6$ are independently selected from the group consisting of —H, —OH, —COOM, —SO$_3$M, —SH, —CH$_2$COOM, —SCH$_2$COOM, and —Y, wherein M and Y are as defined.

We have now discovered that blends of the nonhalogenated vinyl copolymer and the Half-ester Polyurethane unexpectedly provide magnetic coatings with a combination of both higher modulus and higher resilience as compared to similar blends in which a vinyl chloride copolymer such as EC-130™ vinyl chloride copolymer is used as the vinyl copolymer.

Preferably, the Half-ester Polyurethane has a carboxyl equivalent weight in the range from 2000 to 30,000. In preferred embodiments, the Half-ester Polyurethane may also comprise a plurality of pendant hydroxyl and/or radiation curable moieties to facilitate curing of the polymer. If hydroxyl and/or radiation curable moieties are present, the Half-ester Polyurethane preferably has an equivalent weight based on such moieties in the range from 500 to 50,000, more preferably 1000 to 5000.

The Half-ester Polyurethane can be prepared according to a three-step reaction scheme. In the first step, excess polyisocyanate is reacted with polyol to form an NCO-capped precursor. The reaction occurs in a suitable solvent under anhydrous conditions in the presence of a suitable catalyst at a temperature in the range from 60° C. to 80° C. In a second step, a 1,4- or 1,5-dicarboxylic acid is added and heating continues. During this second step, the dicarboxylic acid rapidly reacts with some of the available NCO moieties to form the corresponding cyclic anhydride in situ. Preferably, the dicarboxylic acid is a 1,4- or 1,5-dicarboxylic acid containing at least one additional dispersing group other than the two acid groups. Such dicarboxylic acids form cyclic anhydrides easily under dehydrating conditions, whereby the resulting cyclic anhydride is a five-membered ring or a six-membered ring, respectively, having a pendant dispersing group. More preferably, the dicarboxylic acid is selected from citric acid, mercaptosuccinic acid, dimercaptosuccinic acid, and mixtures thereof. The reaction occurring during the second step is exemplified by the following reaction scheme in which citric acid is the dicarboxylic acid and R—NCO represents a compound with an available NCO moiety:

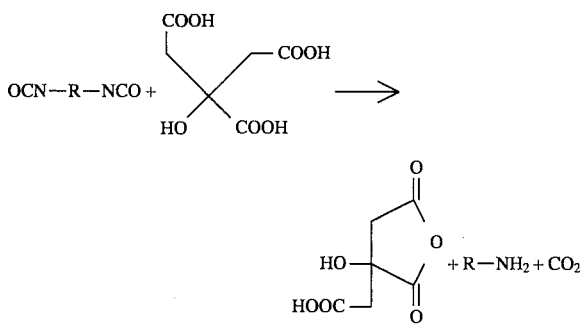

In a third step, heating continues as excess triol is added to the reaction mixture. The NCO precursor and the cyclic anhydride then react with available hydroxyl groups from the triol, and the resultant product is a polyurethane polymer with pendant hydroxyl groups, some or all of which may be esterified with the anhydride. The reaction of the anhydride with the pendant hydroxyl is exemplified by the following scheme in which citric acid anhydride is used:

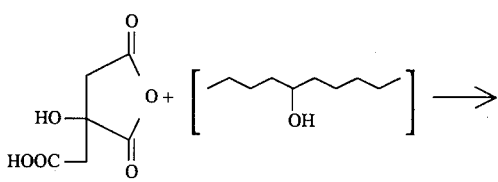

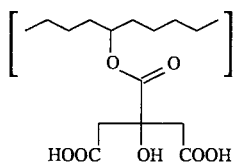

When NCO and anhydride can no longer be detected by infrared analysis, the reaction is deemed to be complete.

Another preferred polyurethane (hereinafter "Graft Polyurethane") is a polyurethane comprising a pendant nonhalogenated, copolymeric vinyl moiety, wherein the nonhalogenated, copolymeric vinyl moiety bears a plurality of nitrile groups. Preferably, the nonhalogenated, copolymeric vinyl moiety is a copolymeric moiety of monomers comprising (meth)acrylonitrile and optionally one or more of styrene or an alkyl ester of (meth)acrylic acid, wherein the alkyl group of the alkyl ester has 1 to 20, preferably 1 to 4, carbon atoms. In those embodiments of the present invention in which the nonhalogenated, copolymeric vinyl moiety comprises an alkyl ester of (meth)acrylic acid, the alkyl ester is preferably methyl (meth)acrylate. Graft polyurethanes and their preparation have been described in Assignee's copending application U.S. Ser. No. 07/852,937, Attorney's Docket No. 45034USA2B, filed Mar. 13, 1992, which is a continuation of Assignee's application Ser. No. 07/543,343, Attorney's Docket No. 45034USA1A, filed Jun. 25, 1990, now abandoned. The vinyl copolymeric moiety of such polyurethanes greatly enhances the compatibility of such polyurethanes with the nonhalogenated vinyl copolymer, particularly when the polyurethane also incorporates polycaprolactone polyols.

In addition to the nonhalogenated vinyl copolymer, the secondary polymer component if any, and the magnetic pigment, the magnetic layer of the present invention may also comprise one or more conventional additives such as lubricants; abrasives; crosslinking agents; head cleaning agents; thermal stabilizers; antioxidants; dispersants; wetting agents; antistatic agents; fungicides; bactericides; surfactants; coating aids; nonmagnetic pigments; and the like in accordance with practices known in the art.

As one example of a process for preparing a magnetic recording medium, the components of the magnetic layer are combined and mixed with a suitable solvent to form a substantially homogeneous dispersion. The dispersion is then coated onto a nonmagnetizable substrate, which may be primed or unprimed. The dispersion may be applied to the substrate using any conventional coating technique, such as gravure or knife coating techniques. The coated substrate may then be passed through a magnetic field to orient the magnetic pigment after which the coating is dried, calendered if desired, and then allowed to cure.

Curing can be accomplished in a variety of ways. As one approach, an isocyanate crosslinking agent can be added to the dispersion just before the dispersion is coated onto the substrate. As soon as the isocyanate crosslinking agent is added to the dispersion, the NCO groups of the isocyanate crosslinking agent will begin to react with the hydroxyl groups of the polymeric binder. Preferably, a catalyst, e.g., dibutyltin dilaurate, may also be added in suitable catalytic amounts in order to facilitate this crosslinking reaction. Generally, using from 0.02 to 0.2 parts by weight of catalyst per 100 parts by weight of magnetic pigment has been found to be suitable in the practice of the present invention.

The isocyanate crosslinking agent, if any, is a polyfunctional isocyanate having an average functionality of at least 2 isocyanate groups per molecule. Examples of specific polyfunctional isocyanate useful as the isocyanate crosslinking agent in the practice of the present invention include materials commercially available as MONDUR CB-601, CB-75, CB-701, MONDUR-MRS from Miles, Inc.; DESMODUR L available Bayer A.G.; CORONATE L from Nippon Polyurethane Ind., Ltd.; and PAPI from Union Carbide Corp.

The isocyanate crosslinking agent is preferably used in an amount such that the molar ratio of NCO groups from the isocyanate crosslinking agent to the total number of hydroxy groups from the hydroxy functional polymer is greater than 0. Preferably, the molar ratio of the NCO groups from the isocyanate crosslinking agent to the total number of hydroxy groups from the hydroxy functional polymer is in the range from 0.3 to 5, more preferably 0.5 to 1.5.

As another approach, when one or more components of the polymeric binder contain radiation curable moieties, the dried coating may be irradiated to achieve curing of the radiation curable materials. Irradiation may be achieved using any type of ionizing radiation, e.g., electron beam radiation or ultraviolet radiation, in accordance with practices known in the art. Preferably, radiation curing is achieved with an amount of electron beam radiation in the range from 1 to 20 Mrads, preferably 4 to 12 Mrads, and more preferably 5 to 9 Mrads of electron beam radiation having an energy in the range from 100 to 400 kev, preferably 200 to 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising nitrogen or a noble gas and having an oxygen content of less than 500 parts per million ("ppm"). A preferred inert atmosphere is a nitrogen atmosphere having an oxygen content of less than 75 parts per million.

The use of radiation curing techniques may offer some advantages over isocyanate curing techniques. Whereas isocyanate curing of magnetic media is chemically unselective and highly dependent on such variables as temperature and humidity, however, radiation curing techniques are less sensitive to temperature and humidity. Moreover, radiation curing techniques allow one to control, to a certain extent, which polymers become crosslinked and which polymers do not become crosslinked. For instance, for a polymeric binder containing a polyurethane polymer and a nonhalogenated vinyl copolymer wherein only the polyurethane has a pendant radiation curable moiety, the 'soft' polyurethane may be cured by electron beam induced crosslinking of the radiation curable moiety on the polyurethane polymer. The 'hard' vinyl copolymer, having no radiation curable moieties, is not formally cured (Experiments have shown, however, that the vinyl copolymer does undergo some crosslinking upon exposure to E-beam irradiation, e.g., it is known in the literature that styrene-acrylonitrile copolymers undergo crosslinking during E-beam exposure.). The rationale for this strategy is that the 'hard' resin phase (i.e. the vinyl copolymer) already has a high $T_g$ and a high modulus without the addition of any chemical crosslinks. Hence, one can hypothesize that there is no need to crosslink this 'glass-like' phase. However, crosslinking (or 'cure') is needed in the 'soft' polyurethane phase, because crosslinking of the polyurethane results in an increase in the molecular weight of this material which gives improved physical properties.

Traditionally, radiation curable formulations have most commonly relied upon the reactivity of acrylates, methacrylates, and the like to achieve radiation-induced crosslinking. Unfortunately, however, magnetic dispersions prepared from such materials tend to undergo unwanted crosslinking reactions under ambient conditions to form gels, particularly when the magnetic pigment is a metal particle pigment. These dispersions are especially prone to suffer from undesirable crosslinking during dispersion milling.

However, because radiation curable polymers having dispersing groups are capable of wetting/dispersing the magnetic pigment, it would be desirable to include at least some of such polymers in the milling step. In order to accomplish this, radiation curable (meth)acrylate groups may be replaced by allyloxy groups (—O—CH$_2$—CH=CH$_2$), or α-methyl styrene moieties of the formula

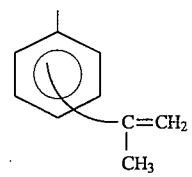

Allyloxy groups and o-methyl styrene moieties are more stable to the milling process than (meth)acrylate groups.

The present invention will now be further described with reference to the following examples.

As used throughout the Examples, the following abbreviations are used:

"AIBN" means 2,2'-azobisisobutyronitrile.

"AN" means acrylonitrile.

"HEA" means hydroxyethylacrylate.

"HEMA" means hydroxyethylmethacrylate.

"HPA" means hydroxypropylacrylate,

"IEM" means isocyanatoethyl methacrylate.

"MA" means methyl acrylate.

"MAA" means methacrylic acid.

"MEK" means methyl ethyl ketone.

"MMA" means methyl methacrylate.

"MOTAC" means methacryloyloxyethyl trimethyl ammonium chloride.

"MPD" means mercaptopropane diol.

"MSA" means mercaptosuccinic acid.

"PET" means polyethylene terephthalate,

"S" means styrene.

"SDS" means sodium dodecylbenzene sulfonate.

"Meta-TMI" means a compound of the formula

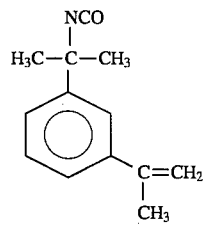

EXAMPLE

Preparation of nonhalogenated vinyl copolymers

Samples of nonhalogenated vinyl copolymers of the present invention were prepared from the following ingredients:

|  | Sample No. | | | | | | | | | | |
|---|---|---|---|---|---|---|---|---|---|---|---|
| Ingredient | 1A | 1B | 1C | 1D | 1E | 1F | 1G | 1H | 1I | 1J | 1K |
| parts by weight S | 161.25 | 161.88 | 157.5 | 107.8 | — | 161.25 | 161.25 | 161.25 | 80.6 | — | 161.25 |
| parts by weight MMA | — | — | — | — | 161.25 | — | — | — | 80.6 | 211.2 | — |
| parts by weight AN | 50.0 | 50.0 | 50.0 | 73.5 | 50.0 | 50.0 | 50.0 | 50.0 | 50.0 | — | 50.0 |
| parts by weight HPA | 37.5 | 37.5 | 37.5 | 63.7 | 37.5 | — | — | 37.5 | 37.5 | 37.5 | — |
| parts by weight HEA | — | — | — | — | — | 37.5 | 37.5 | — | — | — | — |
| parts by weight MOTAC | 1.25 | 0.625 | 5.0 | 4.9 | 1.25 | 1.25 | 1.25 | 1.25 | 1.25 | 1.25 | 1.25 |
| parts by weight MSA | — | — | — | — | — | 0.5 | 1.25 | — | — | — | — |
| parts by weight MPD | 0.5 | 0.5 | 0.5 | 0.5 | 0.5 | 0.5 | 0.5 | — | 0.5 | 0.5 | 0.5 |
| parts by weight MEK | 375 | 375 | 375 | 375 | 375 | 375 | 375 | 375 | 375 | 375 | 375 |
| parts by weight AIBN | 1.25 | 1.25 | 1.25 | 1.25 | 1.25 | 1.25 | 1.25 | 1.25 | 1.25 | 1.35 | 1.25 |
| parts by weight HEMA | — | — | — | — | — | — | — | — | — | — | 37.5 |

For each sample, the ingredients were charged into a 32 oz. amber reaction bottle. The resultant admixture, which contained some undissolved methacryloyloxyethyl trimethyl ammonium chloride, was purged with $N_2$ for 7 minutes at 1 liter per minute, after which the bottle was sealed. The sealed bottle and its contents were tumbled in a constant temperature bath, at 65° C. or 70° C. for 80 hours. The product was a clear, homogeneous solution containing a nonhalogenated vinyl copolymer of the present invention.

The inherent viscosity of some of the samples in MEK was measured according to the procedure described in F. Rodriguez, "Principles of Polymer Systems," Chemical Engineering Series, 2nd Edition (McGraw-Hill), pages 181–185. For some samples, Tg was also measured. The results are shown in the following table:

|  | Sample No. | | | | | | | | | | |
|---|---|---|---|---|---|---|---|---|---|---|---|
|  | 1A | 1B | 1C | 1D | 1E | 1F | 1G | 1H | 1I | 1J | 1K |
| Inherent Viscosity | .3054 to .3313 | .3198 | .2955 | .3285 | .2896 | .2661 | .2482 | .3777 | .2914 | .2177 | — |
| Tg | 79° C. | 80° C. | 78° C. | — | — | — | — | — | — | — | — |

EXAMPLE 2

Preparation of nonhalogenated vinyl copolymers

Samples of nonhalogenated vinyl copolymers of the present invention were prepared from the following ingredients:

|  | Sample No. | |
|---|---|---|
| Ingredient | 2A | 2B |
| parts by weight S | 103.2 | 103.2 |
| parts by weight AN | 32 | 32 |
| parts by weight HPA | 24 | 24 |
| parts by weight MOTAC | 0.8 | 0.8 |
| parts by weight deionized water | 640 | 640 |
| parts by weight SDS | 3.2 | 3.2 |

-continued

|  | Sample No. | |
|---|---|---|
| Ingredient | 2A | 2B |
| parts by weight carbon tetrabromide | 0.48 | 0.96 |
| parts by weight potassium persulfate | 0.36 | 0.26 |
| parts by weight sodium metabisulfite | 0.12 | 0.12 |

For each sample, all the ingredients, except the potassium persulfate and the sodium metabisulfite, were placed in a blender cup and purged with $N_2$ at 1 liter per minute for 5 minutes. The contents of the blender cup were then homogenized for 1 minute, after which initiator (potassium persulfate and sodium metabisulfite) was added. The resultant mixture was transferred to a 1-liter 3-neck split flask equipped with a mechanical stirrer, nitrogen inlet, and a device to observe exotherm. The solution was heated to 35° C. After about 1 hour, the solution exothermed to 56° C. After the exotherm subsided, the mixture was stirred for another 2 hours as it cooled down to room temperature. After this, the mixture was drained into a quart jar. Sample 2A showed an inherent viscosity in MEK and DMF of 1.7454 and 2.233, respectively. Sample 2B showed an inherent viscosity in MEK of 1.1560.

EXAMPLE 3

Samples of nonhalogenated vinyl copolymers of the present invention were prepared from the following ingredients:

| Ingredient | Sample No. | | | |
|---|---|---|---|---|
| | 3A | 3B | 3C | 3D |
| parts by weight S | 30 | 30 | — | — |
| parts by weight MMA | — | — | 30 | 30 |
| parts by weight AN | 10 | 12.5 | 10 | 12.5 |
| parts by weight MAA | 5 | 2.5 | 5 | 2.5 |
| parts by weight HEMA | 5 | 5 | 5 | 5 |
| parts by weight MEK | 75 | 75 | 75 | 75 |
| parts by weight AIBN | 0.15 | 0.15 | 0.15 | 0.15 |

For each sample, the ingredients were charged into an 8 oz. amber reaction bottle. The resulting mixture was purged with $N_2$ for 3 minutes at 1 liter per minute, after which the bottle was sealed. The sealed bottle containing a clear solution was tumbled in a constant temperature bath for 48 hours at 65° C. The product in each case was a slightly viscous, clear solution.

EXAMPLE 4

Using the procedure of Example 1, samples of nonhalogenated vinyl copolymers of the present invention were prepared from the following ingredients:

| Ingredient | Sample No. | | | | | | |
|---|---|---|---|---|---|---|---|
| | 4A | 4B | 4C | 4D | 4E | 4F | 4G |
| parts by weight S | 108.7 | 167.5 | 132.5 | — | 147.5 | 135.0 | 150.0 |
| parts by weight MMA | — | — | — | 160.0 | — | — | — |
| parts by weight AN | 75 | 56.3 | 91.25 | 51.25 | 43.8 | 89.4 | 103.5 |
| parts by weight HPA | 65 | 25 | 25 | 37.5 | 37.5 | 25.0 | 45.0 |
| parts by weight MOTAC | 1.25 | 1.25 | 1.25 | 1.25 | 1.25 | 0.62 | 1.5 |
| parts by weight MPD | 0.5 | 0.5 | 0.5 | 0.5 | 0.5 | 0.5 | 0.6 |
| parts by weight MEK | 375 | 375 | 375 | 375 | 375 | 375 | 338 |
| parts by weight AIBN | 1.25 | 1.25 | 1.25 | 1.25 | 1.25 | 1.25 | 1.8 |
| parts by weight MA | — | — | — | — | 20.0 | — | — |

EXAMPLE 5

Preparation of polyurethane with mercapto succinic acid wetting groups (Sample "5A")

To a 20 gallon reactor were added 7.5 kg TONE 0210™ polycaprolactone diol (17.7 eq), 1.9 kg neopentyl glycol (36.7 eq), 10.2 g dibutyltin dilaurate, and 27 kg MEK. 8.9 kg diphenylmethane-4,4'-diisocyanate ("MDI") (71.2 eq) was then added. The resultant mixture was heated at reflux for 1 hour, after which 195.8 g mercaptosuccinic acid (1.5 eq) were added. Then, 6.6 kg TONE™ 0305 polycaprolactone triol (36.7 eq), and an additional 9 kg MEK were added. Heating at reflux continued for an additional 2 hours, after which infrared spectroscopic analysis showed that all of the anhydride and all of the isocyanate had been consumed. An additional 590 g MDI (4.72 eq) was added and the mixture was heated at reflux for an additional hour. The mixture showed an inherent viscosity in tetrahydrofuran of 0.28 dl/g. The mercaptosuccinic acid equivalent weight of the resultant polyurethane was calculated to be 19,600, and the hydroxyl equivalent weight was calculated to be 1425.

EXAMPLE 6

Preparation of polyurethane with mercaptosuccinic acid wetting groups and pendant radiation curable (methacrylate) moieties (Sample "6A")

27.0 g of isocyanatoethyl methacrylate and a few drops of dibutyltin dilaurate were added to 600 g (0.17 mole OH) of a 43.6% solution of polyurethane Sample 5A in MEK. The solution was sealed and heated at 55° C. overnight. The next day, the infrared analysis showed that substantially all of the isocyanate had been consumed, and the reaction was deemed to be complete.

EXAMPLE 7

Preparation of polyurethane with mercaptosuccinic acid wetting groups and pendant radiation curable (allyloxy) moieties (Sample "7A")

To a 2-liter flask were added 214 g TONE 0210™ polycaprolactone diol available from Union Carbide Corp. (OH eq. weight=425; 0.503 eq), 30.1 g neopentyl glycol (0.579 eq), 30 g of 3-allyloxy-1,2-propanediol available from Aldrich Chemical Co. (0.454 eq), and 862 g MEK. 75 g MEK were distilled off to dry the mixture. 229.4 g diphenylmethane diisocyanate (1.835 eq) were then added followed by 0.2 g dibutyltin dilaurate. The mixture was heated at reflux for 2 hours, then cooled to 50° C. 4.5 g mercaptosuccinic acid (0.03 moles) were then added followed by 86.2 g TONE 0305™ polycaprolactone triol available from Union Carbide Corporation (OH eq. weight= 180; 0.479 eq) and 129 g MEK. The reaction mixture was heated at reflux for 1 hour. An additional 3 g diphenylmethane diisocyanate was then added, and the reaction mixture was heated at reflux for 2 more hours. The inherent viscosity of the resultant polyurethane polymer in tetrohydrofuran was 0.30 dl/g. The polymer was calculated to have a hydroxyl equivalent weight of 3000, an allyloxy equivalent weight of 2600, and a mercaptosuccinic acid equivalent weight of 20,000.

EXAMPLE 8 a. Polyurethane polymers were prepared using the following ingredients in the following amounts in accordance with the procedure of Example 5 except that (1) when the "other polyol" was used, it was charged to the reactor immediately following the neopentyl glycol and (2) for Sample 8E, RUCOFLEX S-1019-35™ polyester diol was substituted for both the TONE 0210™ diol and the TONE 0305™ triol.

| Ingredient | Sample No. | | | | |
|---|---|---|---|---|---|
| | 8A | 8B | 8C | 8D | 8E |
| parts by weight TONE 0210 diol | 179.2 | 129.0 | 151.4 | 428.9 | 20.7* |
| parts by weight neopentyl glycol | 6.3 | 29.3 | 36.3 | 112.5 | 6.6 |
| parts by weight other polyol | — | 150** | 75** | — | 2.0*** |
| parts by weight dibutyltin dilaurate | 0.1 | 0.1 | 0.1 | 0.1 | 0.1 |
| parts by weight MEK | 393 | 710 | 680 | 1583 | 90 |
| parts by weight MDI | 76.6 | 160.5 | 185.9 | 515.6 | 30.5 |
| parts by weight mercapto-succinic acid | 2.1 | 4.5 | 4.5 | — | — |
| parts by weight TONE 0305 triol | 16.8 | 118.49 | 137.3 | 380.7 | 139.3* |
| parts by weight additional MEK | 25 | 178 | 206 | 571 | 209 |
| parts by weight additional MDI | — | 23.3 | 19.5 | 32.4 | — |

The resultant polyruethane polymers had the following characteristics:

| Ingredient | Sample No. | | | | |
|---|---|---|---|---|---|
| | 8A | 8B | 8C | 8D | 8E |
| dispersing group equivalent weight | 20,000 | 20,000 | 20,000 | — | — |
| OH equivalent weight | 5000 | 2254 | 1915 | 1700 | 10,000 |
| inherent viscosity in tetrahydrofuran | 0.47 | 0.288 | 0.292 | 0.29 | 0.74 |

*RUCOFLEX S-1019-35 ™ polyester diol (molecular weight about 3000 used in place of TONE 0210 ™ diol and TONE 0305 ™ triol).
**"Other polyol" was HN-6 ™ diol commercially available from Toagosei Chemical Industry. This diol is a styrene/acrylonitrile macromonomer diol having a molecular weight of about 6000 and a styrene:acrylonitrile ratio of about 3:1.
***"Other polyol" was trimethylolpropane.

Preparation of polyurethane sample 8F: To a reactor were added 560 g (1.098 equivalents) "RUCOFLEX S-1014-110" polyester polyol (Ruco Polymer Corporation), 191.3 g (3.68 equivalents) neopentyl glycol, 15.4 g (0.345 equivalents) trimethylol propane, 14 g (0.093 equivalents) mercaptosuccinic acid and 2100 g MEK. After stirring to dissolve all ingredients, 619 g MDI (4.9 equivalents) were added followed by 0.2 g dibutyltin dilaurate. After 3 hours reaction time a product was obtained which had an inherent viscosity in tetrahydrofuran of 0.31 g/dl. Its hydroxyl equivalent weight is calculated to be 5000 g/eq and its MSA equivalent weight is calculated at 15,000 g/eq.

c. Preparation of polyurethane sample 8G: To 2500 (0.50 mole OH) of a 39.7% solution of polyurethane Sample 8B in methyl ethyl ketone was added 76.9 g (0.50 mole) of isocyanatoethyl methacrylate (IEM) and a few drops of dibutyl tin dilaurate (DBTDL). The solution was sealed in a gallon jar and heated at 45° C. until IR analysis showed that the IEM had been completely consumed in the reaction (overnight heating is usually adequate). The resulting material was used without any further purification.

d. Preparation of polyurethane sample 8H: To a 5-liter flask were added 283 g TONE 0210™ polycaprolactone diol available from Union Carbide Corp. (OH eq weight=425; 0.666 eq), 34.4 g of neopentyl glycol (0.662 eq), 325 g HN6™ diol (0.130 eq) and 1930 g MEK. 380 g of MEK were distilled off to dry the mixture. 34.4 g of 3-allyloxy-1,2-propane diol available from Aldrich Chemical Co. (0,520 eq) was added followed by 342 g diphenylmethane diisocyanate (2,741 eq) and 0.5 g dibutyltin dilaurate. The mixture was heated at 80° C. for 2 hours. 9.8 g mercaptosuccinic acid (0.07 moles) were then added followed by 253 g TONE 0305™ polycaprolactone triol available from Union Carbide Corporation (OH eq. weight=180; 1.406 eq) and 380 g MEK. The reaction mixture was heated at reflux for 3 hours. An additional 52 g of diphenylmethane diisocyanate was then added, and the reaction mixture was heated at reflux for 3 more hours. The inherent viscosity of the resultant polyurethane polymer in tetrahydrofuran was 0.32 dl/g. The polymer was calculated to have a hydroxyl equivalent weight of s300, and allyloxy equivalent weight of 5000, and a mercaptosuccinic acid equivalent weight of 20,000.

EXAMPLE 9

Preparation of magnetic dispersions a. Three magnetic dispersions were prepared using the following ingredients:

| Ingredient | Dispersion Sample No. | | |
|---|---|---|---|
| | 9A | 9B | 9C |
| parts by weight magnetic pigment (SMO III ™ cobalt-doped $Fe_2O_3$) | 25.0 | 25.0 | 25.0 |
| parts by weight Carbon black (KETJAN ™) | 1.50 | 1.50 | 1.50 |
| parts by weight Sample 1A copolymer solution* | 9.2 | — | — |
| parts by weight Sample 1B copolymer solution* | — | 9.2 | — |
| parts by weight Sample 1F copolymer solution* | — | — | 9.2 |
| parts by weight Sample 5A polyurethane solution** | 3.9 | 3.9 | 3.9 |
| parts by weight MEK | 43.7 | 43.7 | 43.7 |

*Each of these was a solution of 39% solids in MEK.
**This was a solution of 40% solids in MEK.

The ingredients for each sample were combined with 200 g of 1.0–1.3 mm yttrium-stabilized ceramic milling media in three 6 oz. quickie mills, respectively, and simultaneously milled for 7 hours on a Red Devil™ paint shaker.

Each dispersion was evaluated by microscopic examination, at 200×magnification, of a thin smear of the dispersion on a glass microscope slide. All three resulting dispersions were smooth and creamy. Each dispersion provided a uniform background on the slides, although the Sample 9A dispersion prepared from the Sample 1A copolymer provided the dispersion with the most workable texture. All three dispersions showed only minimal solvent separation, even after being stored for 7 days.

b. A magnetic dispersion (Sample 9D) was prepared from the following ingredients:

| Ingredient | Parts by Weight |
|---|---|
| magnetic pigment (SMO III ™ cobalt-doped $Fe_2O_3$) | 25.0 |
| Carbon black (Ketjan ™) | 1.50 |
| Sample 5A polyurethane solution* | 3.25 |
| Sample 1K copolymer solution** | 9.92 |
| MEK | 39.7 |

*This solution was 40% solids in MEK.
**This solution was 36.3% solids in MEK.

The above ingredients were directly added to a "Quickie Mill". The contents of the mill were then manually mixed with a spatula for 1 minute before adding 50 ml of 1–1.3 mm yttrium-stabilized ceramic milling media. After milling for 6 hours, a glass slide of the resulting dispersion was taken and determined to be smooth by microscopic examination at 400×magnification using transmitted light. "Smooth" means that the sample showed a uniform texture and color with substantially no opaque, agglomerated particles. The dispersion was then drawn from the mill into a 4 oz. jar. The finished dispersion was monitored over time to monitor changes in viscosity and reagglomeration.

For example, the sample showed an initial high-shear viscosity ($10^4$ sec$^{-2}$) of 20 cps and a low, low-shear viscosity by visual examination. The initial dispersion was also deemed to be smooth based on the absence of pigment agglomerates. After 4 days of standing, the sample was subjected to 15 sec of high speed mixing before sampling for viscosity and smoothness. Both the high and low-shear viscosity and smoothness were unchanged compared to the initial results.

EXAMPLE 10

Preparation of magnetic recording media

Five magnetic recording media samples were prepared from the following ingredients in the following amounts:

| INGREDIENTS IN PARTS BY WEIGHT | Sample No. | | | | |
|---|---|---|---|---|---|
| | 10A | 10B | 10C | 10D | 10E |
| SHO I ™ cobalt doped iron oxide | 29.6 | 29.6 | 30.3 | 29.9 | 30.1 |
| dispereant (1:1 Emcol Phosphate/phosphorylated polyoxyalkyl polyol; See U.S. Pat. No. 5,028,483 at col. 5) | 2.1 | 2.1 | 2.1 | 2.1 | 2.1 |
| Polyurethane polymer solution (30% solids in MEK) | 8.9 | 10.6 | 9.1 | 7.4 | 5.8 |
| Sample 1A copolymer solution (36.2% solids in MEK) | — | 1.9 | 2.5 | 3.0 | 3.6 |
| VAGH ™ copolymer solution (31.6% solids in MEK) | 2.9 | — | — | — | — |
| CB-601 ™ Curing Agent solution (60% solids in PM acetate) | 2.2 | 1.7 | 2.3 | 2.7 | 3.2 |
| Alumina | 2.5 | 2.5 | 2.6 | 2.6 | 2.6 |
| Lubricant (1:2.2 Myristic Acid/Butyl Myristate) | 1.5 | 1.5 | 1.5 | 1.5 | 1.5 |
| MEK | 21.6 | 21.6 | 21.0 | 21.8 | 22.1 |
| Toluene | 17.3 | 17.2 | 17.6 | 17.5 | 17.6 |
| Cyclohexanone | 12.1 | 12.0 | 11.8 | 12.2 | 12.3 |

The ingredients for each magnetic recording medium sample were charged into five separate Igarashi mills, respectively. The resulting mixtures were simultaneously milled for about 6 hours using 0.8 to 1.0 mm Zirconia SEPR™ beads as the milling media. The mills were cooled using cold water jackets during milling. Bulk magnetic properties of the resulting dispersions were determined and the results are shown in the following table:

| Dispersion Sample No. | Coercivity (Oe) | Square-ness | 45° Gloss | Rodenstock Value | ICI Viscosity |
|---|---|---|---|---|---|
| 10A | 739 | 0.83 | 41.8 | 19.2 | 16 |
| 10B | 723 | 0.77 | 47.3 | 12.4 | 27 |
| 10C | 715 | 0.74 | 55.6 | 9.2 | 26 |
| 10D | 719 | 0.74 | 58.1 | 9.0 | 29 |
| 10E | 713 | 0.75 | 44.3 | 9.1 | 23 |

*As used throughout this specification, "Rodenstock value" is a measure of smoothness of a coating and was measured using a RODENSTOCK RM-400 surface finish analyzer commercially available from Rodenstock Co. Generally, a higher Rodenstock value corresponds to a smoother surface.

EXAMPLE 11

Magnetic dispersions were prepared using the Sample 1D, 1C, 1A, and 4A copolymers in combination with the Sample 5A polyurethane. For comparison purposes, a magnetic dispersion was also prepared using EC-130™ vinyl chloride copolymer in combination with the Sample 5A polyurethane. The dispersions were prepared from the following ingredients in the following amounts:

| Ingredient | Sample No. | | | | | |
|---|---|---|---|---|---|---|
| | 11A | 11B | 11C | 11D | 11E | 11F |
| parts by weight 1D solution (40% solids in MEK) | 94.8 | — | — | — | — | — |
| parts by weight 1C solution (39% solids in MEK) | — | 97.7 | — | — | — | — |
| parts by weight 1A solution (39% solids in MEK) | — | — | 97.7 | — | — | — |
| parts by weight 4A solution (39% solids in MEK) | — | — | — | 97.6 | — | — |
| par by weight EC-130 ™ vinyl chloride copolymer | — | — | — | — | 172 | 183 |

-continued

| Ingredient | Sample No. | | | | | |
|---|---|---|---|---|---|---|
| | 11A | 11B | 11C | 11D | 11E | 11F |
| parts by weight 5A solution (about 42% solids in MEK) | 59.4 | 59.4 | 59.6 | 59.4 | 57.7 | 60.6 |
| parts by weight metal particle magnetic pigment (TODA ™) | 168 | 168 | 168 | 168 | 160 | 168 |
| parts by weight alumina (CERALOX ™ 0.4x) | 8.42 | 8.48 | 8.44 | 8.39 | 8.31 | 8.53 |
| parts by weight MEK | 271 | 268 | 273 | 268 | 53.6 | 18 |
| parts by weight xylene | — | — | — | — | 153 | — |

To prepare each dispersion, the vinyl copolymer solution, the polyurethane solution, and the MEK and/or xylene were added to a glass jar and thoroughly mixed. Next, the magnetic pigment was added under $N_2$. Next, the jar was removed from the $N_2$ and the alumina was added. Next, the mixture was high shear mixed for several minutes. The mixture was then charged to an Igarashi mill containing ceramic media and milled for 8–10 hours at 1500 rpm.

Two coatings were prepared from each dispersion. The first coating was a handspread coated onto a PET substrate using a knife coater (2 mils wet coating thickness) with an orienting field. Except for Sample 11E, the second coating was prepared by first thinning the dispersions with a sufficient amount of MEK and xylene to achieve about 25% solids and a 90/10 MEK/xylene solvent blend. Sample 11e was first thinned to obtain about 25% solids and a 80/20 MEK/xylene solvent blend. Next, for each sample, the dispersion was cast (40 mils wet coating thickness) onto a fluorinated ethylene propylene ("FEP") coated surface (a surface that will later release the magnetic coating) covering the coating to slow the drying rate, and allowing the coatings to dry overnight. The air-dried coatings were then removed from the FEP surface and annealed at 45° C. for 16 hours. Bulk magnetic and coating properties of the handspreads are given below:

| Sample | Binder | Rodenstock Value | Squareness | E' 20° C. | E' 80° C. |
|---|---|---|---|---|---|
| 11A | 1D/5A | 8.4 | 0.73 | 3.6 | 2.1 |
| 11B | 1C/5A | 9.3 | 0.73 | 4.1 | 2.8 |
| 11C | 1A/5A | 9.9 | 0.76 | 4.0 | 2.4 |
| 11D | 4A/5A | 8.1 | 0.75 | 4.0 | 2.3 |
| 11E | EC130/5A | 8.6 | 0.71 | 2.9 | 1.1 |
| 11F | EC130/5A | 8.3 | 0.74 | — | — |

*Throughout this specification, the storage moduli (E') in GPa were determined with a Dupont 982 Dynamic Mechanical Analysis instrument.

The coatings prepared with the vinyl copolymer were tougher and much more flexible than would be expected considering the Tg's of the polymers used to prepare the coatings. The coatings also had moduli which are significantly higher than analogous coatings prepared with EC-130™ vinyl chloride copolymer. Further, the high temperature phase transition of Samples 11A, 11B, 11C, and 11D occurred at a significantly higher temperature than it did for Samples 11E and 11F.

EXAMPLE 12

The procedure used to prepare the Sample 11C (1A/5A binder) dispersion was used to prepare another magnetic dispersion (Sample 12A) using 97.9 g of 1A copolymer solution (39.2% solids in MEK), 62.9 g of 8D polyurethane solution (39.2% solids in MEK), 267 g MEK, 168 g Toda™ metal particle magnetic pigment, and 8.40 g Ceralox alumina. Sample 12A differs from Sample 11C in that the Sample 8D polyurethane was substituted for the Sample 5A polyurethane. The 8D polyurethane is substantially identical to the Sample 5A polyurethane except that the 8D polyurethane does not contain any MSA wetting groups. A handspread and coating was prepared using the same procedures used in preparing the handspread and coating from Sample 11C. The bulk magnetic and coating properties of the resultant handspread are compared to the results for Sample 11C:

| Sample | Binder | Rodenstock Value | Squareness | E' 20° C. | E' 80° C. |
|---|---|---|---|---|---|
| 11C | 1A/5A | 9.9 | 0.76 | 4.0 | 2.4 |
| 12A | 1A/8D | 7.2 | 0.73 | severely cracked | |

Whereas Sample 11C gave a tough, high modulus coating, Sample 12A resulted in a severely cracked coating. This demonstrates the influence of the polyurethane on the mechanical properties of the magnetic coating.

EXAMPLE 13

The procedure used to prepare Sample 11C (1A/5A binder) dispersion was used to prepare another magnetic dispersion (Sample 13A) using 97.5 g of Sample 4D copolymer solution (39.5% solids in MEK), 60.4 g of Sample 5A polyurethane solution (42.5% solids in MEK), 267 g MEK, 168 g TODA™ metal particle magnetic pigment, and 8.47 g Ceralox alumina. Sample 13A differs from Sample 11C in that Sample 4D copolymer was substituted for the 1A copolymer. The sample 4D copolymer is identical to the Sample 1A copolymer, except that the Sample 4D copolymer was prepared using methyl methacrylate in place of styrene. A handspread and coating was prepared using the same procedures used in preparing the handspread and coating from Sample 11C. The bulk magnetic and coating properties of the resultant handspread are compared to the results for Sample 11C:

| Sample | Binder | Rodenstock Value | Squareness | E' 20° C. | E' 80° C. |
|---|---|---|---|---|---|
| 11C | 1A/5A | 9.9 | 0.76 | 4.0 | 2.4 |
| 13A | 4D/5A | 6.9 | 0.73 | 3.5 | 1.7 |

Sample 13A had a slightly lower moduli than Sample 11C.

EXAMPLE 14

The procedure used to prepare Sample 11C (1A/5A binder) dispersion was used to prepare another magnetic dispersion (Sample 14A) using 97.8 g of Sample 4E copolymer solution (39.2% solids in MEK), 60.2 g of Sample 5A polyurethane solution (42.5% solids in MEK), 269 g MEK, 168 g Toda™ metal particle magnetic pigment and 8.40 g Ceralox alumina. Sample 14A differs from Sample 11C in that the 4E copolymer was substituted for the 1A copolymer. The sample 4E copolymer is identical to the Sample 1A copolymer, except that some of the styrene and acrylonitrile used to prepare the 1A copolymer was replaced with methyl acrylate (MA). A handspread and coating was prepared using the same procedures used in preparing the handspread and coating from Sample 11C. The bulk magnetic and coating properties of the resultant handspread are compared to the results for Sample 11C:

| Sample | Binder | Rodenstock Value | Squareness | E' 20° C. | E' 80° C. |
| --- | --- | --- | --- | --- | --- |
| 11C | 1A/5A | 9.9 | 0.76 | 4.0 | 2.4 |
| 14A | 4E/5A | 6.8 | 0.75 | 4.1 | 2.3 |

Although its surface was rougher, Sample 14A showed tensile and magnetic properties which were much like those of Sample 11C.

EXAMPLE 15

The procedure used to prepare Sample 11D (4A/5A binder) dispersion was used to prepare three magnetic dispersions:

Sample 15A: 97.4 g of Sample 4A copolymer solution (39.1% solids in MEK), 87.3 g of Sample 8E polyurethane solution (29.2% solids in MEK), 239 g MEK, 168 g DOWA™ metal particle magnetic pigment, and 8.49 g CERALOX alumina.

Sample 15B: 97.7 g of Sample 4A copolymer solution (39.1% solids in MEK), 73.4 g of Sample 8A polyurethane solution (29.2% solids in MEK), 253 g MEK, 168 g DOWA™ metal particle magnetic pigment, and 8.41 g CERALOX alumina.

Sample 15C: 97.6 g of Sample 4A copolymer solution (39.1% solids in MEK), 60.6 g of Sample 8F polyurethane solution (42.1% solids in MEK), 266 g MEK, 168 g DOWA™ metal particle magnetic pigment, and 8.40 g CERALOX alumina.

A handspread and coating was prepared from Samples 15A, 15B, and 15C using the same procedures used in preparing the handspread and coating from Sample 11D. The bulk magnetic and coating properties of the resultant handspreads are compared below:

| Sample | Binder | Rodenstock Value | Squareness | E' 20° C. | E' 80° C. |
| --- | --- | --- | --- | --- | --- |
| 15A | 4A/8E | 29 | 0.70 | heavily cracked | |
| 15B | 4A/8A | 9.5 | 0.72 | 3.1 | 1.5 |
| 15C | 4A/8F | 6.5 | 0.72 | 3.3 | 2.4 |

The very high Rodenstock value of the Sample 15A dispersion illustrates the influence of the polyurethane's wetting group on the quality of the dispersions. The coating from Sample 15A was heavily cracked, whereas the coatings from 15B and 15C were relatively crack-free. The 15B coating was amazingly flexible. It was so resilient it could be folded like a piece of paper. The 15C coating was considerably less resilient than 15B, but still somewhat flexible. The extreme resilience of 15B comes with the price of a lower high temperature modulus. The mechanical properties of the coatings can obviously be tailored by varying the properties of the polyurethane.

EXAMPLE 16

The procedure used to prepare Sample 11D (4A/5A binder) dispersion was used to prepare four magnetic dispersions:

Sample 16A: 93.9 g of Sample 4G copolymer solution (40.7% solids in MEK), 59.9 g of Sample 5A polyurethane solution (42.5% solids in MEK), 271 g MEK, 168 g DOWA™ metal particle magnetic pigment, and 8.42 g CERALOX alumina.

Sample 16B: 93.8 g of Sample 4G copolymer solution (40.7% solids in MEK), 63.8 g of Sample 8B polyurethane solution (40.0% solids in MEK, 267 g MEK, 168 g DOWA™ metal particle magnetic pigment, and 8.39 g CERALOX alumina.

Sample 16C: 97.8 g of Sample 4A copolymer solution (39.1% solids in MEK), 64.0 g of Sample 8B polyurethane solution (40.0% solids in MEK), 263 g MEK, 168 g DOWA™ metal particle magnetic pigment, and 8.40 g CERALOX alumina.

Sample 16D: 97.9 g of Sample 4B copolymer solution (39.0% solids in MEK), 63.9 g of Sample 8B polyurethane solution (40.0% solids in MEK), 263 g MEK, 168 g DOWA™ metal particle magnetic pigment, and 8.40 g CERALOX alumina.

A handspread coating was prepared from Samples 16A, 16B, 16C, and 16D using the same procedures used in preparing the handspread and coating from Sample 11D. The bulk magnetic and coating properties of the resultant handspread are compared below:

| Sample | Binder | Rodenstock Value | Squareness | E' 20° C. | E' 80° C. |
| --- | --- | --- | --- | --- | --- |
| 16A | 4G/5A | 5.4 | 0.71 | 4.1 | 2.7 |
| 16B | 4G/8B | 5.5 | 0.73 | 4.5 | 3.2 |
| 16C | 4A/8B | 6.5 | 0.69 | 3.4 | 2.1 |
| 16D | 4B/8B | 5.6 | 0.70 | too brittle | too brittle |

Replacing Sample 5A with Sample 8B produced a higher modulus coating, illustrating the influence of the polyurethane on the coating's mechanical properties. Sample 4G combined with Sample 8B produced a much higher modulus than when Sample 4A was combined with Sample 8B. Also, Sample 4B combined with Sample 8B produced a much more brittle coating than when Sample 4G or Sample 4A was combined with Sample 8B. These results illustrate how the mechanical properties of the coating can be tailored by altering the type of copolymer and/or polyurethane.

EXAMPLE 17

4.64 lbs MEK, 4.65 lbs of Sample 4B copolymer solution (39% in MEK), and 3.02 lbs of Sample 5A polyurethane solution (40% in MEK) were added to an enclosed, water-cooled, high shear mixing kettle. The mixture was mixed for 15 minutes while cooling and purging with $N_2$ at a rate of 20–30 CFH. When the $O_2$ level reached 1.5%, the $N_2$ flow was reduced to the minimum level required to maintain an $P_2$ level of 1.0%

Next, 11.02 lbs. of DOWA™ metal particle magnetic pigment was added. Mixing continued for one hour. Then 0.55 lbs of CERALOX 0.4 alumina was added and mixing was continued for two hours. The $N_2$ purging and water cooling was then discontinued and the contents of the kettle were transferred to a five gallon pail. 12.60 lbs of MEK were added to the mixture and it was mixed under a high shear mixer for an additional hour.

Next, the mixture was thinned with a sufficient amount of MEK and xylene to attain a dispersion at 30% solids at 90/10 MEK/xylene. This mixture was then charged to a Netzsch 4-liter horizontal sandmill containing 0.8–1.0 mm ceramic media. The mixture was milled until smooth using pass to pass milling with a shaft speed of approximately 1850 RPM and a flow rate of approximately 0.05 GPM. After milling, the dispersion was filtered through a Nippon Roki HT50 filter (8 micron rating) followed by a Nippon Roki HT30 filter (3.5 micron rating).

A carbon black containing backside dispersion was coated onto a 56 gauge PET substrate and dried at 140° F. Next, the other side of this substrate was coated with the above magnetic dispersion. Immediately prior to coating, 299 g of a 2:1 myristic acid:butyl stearate solution (15.7% solids. in MEK) and 135 g of CB-701™ (70% solids in THF) were added to 31.2 lbs of this dispersion, and the dispersion was high shear mixed for approximately ten minutes. A reverse gravure coating method was used and the media was coated at 200 fpm. Three magnets were used to orient the metal particles. The first magnet (2000 G) was placed immediately after the coating head, the second magnet (4500 G) was placed approximately 8 feet downline, and the last magnet (3400 G) was placed approximately 8 feet downline from the second magnet. Two ovens were used to dry the magnetic coating, the first at 140° F., and the second at 180° F. The media was then calendered at 110° F. and 1200 PLI.

The resultant magnetic media had a squareness of 0.77, a coercivity of 1583 Oe, a remanence of 1899 Ga, as measured with a vibrating sample magnetometer (10 kGa), and an average RMS surface roughness of 5.8 nm (as measured by a Wyko high resolution interferometer.)

EXAMPLE 18

6.10 lbs MEK, 0.44 lbs RHODAFAC BG-510™ solution (50% solids in MEK, Rhone-Poulenc Co.), 3.60 lbs of Sample 4G copolymer solution (41% in MEK), and 2.46 lbs of Sample 8B polyurethane solution (40% in MEK) were added to an enclosed, water-cooled, high shear mixing kettle. The mixture was mixed for 15 minutes while cooling and purging with $N_2$ at a rate of 20–30 CFH. When the $O_2$ level reached 1.0%, the $N_2$ flow was reduced to the minimum level required to maintain an $O_2$ level of 1.0%

Next, 11.02 lbs of DOWA™ metal particle magnetic pigment was added. Mixing was continued for two hours. Then, 0.55 lbs of CERALOX 0.4 alumina was added and mixing was continued for one hour. The $N_2$ purging and water cooling was then discontinued and the contents of the kettle were transferred to a five gallon pail. 11.46 lbs of MEK were added to the mixture and it was mixed under a high shear mixer for one hour.

Next, the mixture was thinned with a sufficient amount of MEK and xylene to attain a dispersion at 35% solids at 90/10 MEK/xylene. This mixture was then charged to a Netzsch 4-liter horizontal sandmill containing 0.8–1.0 mm ceramic media. The mixture was milled until smooth using pass to pass milling with a shaft speed of approximately 1850 RPM and a flow rate of approximately 0.05 GPM. After milling, the dispersion was thinned to 26% solids with 90/10 MEK/xylene, filtered through a Nippon Roki HT50 filter (8 micron rating) followed by a Nippon Roki HT30 filter (3.5 micron rating).

A carbon black containing backside dispersion was coated onto a 60 gauge PET substrate and dried at 140° F. Next, the other side of this substrate was coated with the above magnetic dispersion. Immediately prior to coating, 321 g of a 2:1 myristic acid:butyl stearate solution (15.7% solids in MEK) and 59.7 g of CB-701™ cross-linking agent (70% solids in THF) were added to 18.7 lbs of this dispersion and the dispersion was high shear mixed for approximately ten minutes. A reverse gravure coating method was used and the media was coated at 200 fpm. Two magnets were used to orient the metal particles. The first magnet (3100 G) was placed immediately after the coating head and the second magnet (4500 G) was placed approximately 8 feet downline. Two ovens were used to dry the magnetic coating, the first at 140° F. and the second at 180° F. The media was then calendered at 110° F. and 1600 PLI.

The resultant magnetic media had a squareness of 0.69, a coercivity of 1519 Oe, a remanence of 1699 Ga, as measured with a vibrating sample magnetometer (10 kGa), and an average RMS surface roughness of 8.2 nm (as measured by a Wyko high resolution interferometer).

EXAMPLE 19

All of the weights given in this Example are based on 11.02 lbs (5.00 kg) of metal particle pigment being present in the coating formulation. In practice, however, some dispersion may be lost during the various processing steps. If this happens, the weights of the ingredients given in this example must be adjusted in practice to account for the amount of lost metal particle pigment.

This Example describes the use of radiation to selectively 'cure' the soft polyurethane phase of a magnetic coating. The procedure described in this Example can be used to prepare magnetic coatings which have high modulus and high resilience. Both of these properties are important to the durability and runnability of magnetic media.

6 g of propyl gallate, 6 g of Irgafos 168™, and 6.13 lbs (2.39 kg) of a 39% solution of Sample 1A copolymer in methyl ethyl ketone were sequentially added to 5.3 lbs (2.4 kg) of methyl ethyl ketone. The resulting solution was mixed in an enclosed high shear mixer for 10 minutes. The mixing apparatus was then purged with $N_2$ gas.

Next, while maintaining the $N_2$ atmosphere, 11.0 lbs (5.0 kg) of Fe metal particle magnetic pigment (DOWA™) followed by 0.55 lbs (250 g) of Ceralox 0.4x™ alumina were slowly added sequentially to the solution. The mixture was then mixed under the $N_2$ atmosphere in the high shear mixer for an additional 2 hours.

Next, 11.9 lbs (5.4 kg) of methyl ethyl ketone was added to the mixture. The mixture was then mixed with the high shear mixer for an additional 1 hour. The dispersion was thinned down to 37% solids by addition of 2.80 lbs (1.27 kg) of MEK. After this, the mixture was milled pass to pass in a sandmill until smooth using ceramic media.

The magnetic dispersion was then coated onto one pre-primed side of a thin gauge, polyester terephthalate substrate bearing a carbon-black containing backside coating on its other side. Just prior to coating the magnetic dispersion onto the substrate, 2.29 lb (1.04 kg) of a 44.5% solution of Sample 6A polyurethane in methyl ethyl ketone was added to the dispersion. Then, 50 g butyl stearate was blended into the dispersion. Finally, 3.81 lbs (1.73 kg) of MEK and 3.20 lbs (1.45 kg) of xylene were added to the dispersion. After coating the magnetic dispersion onto the substrate, the coated substrate was then immediately passed through three magnetic fields (2000, 4000 and 3400 gauss) to orient the magnetic pigment. The coated substrate was again dried at 140° F., and then the magnetic and backside coating were calendered. The coated substrate was then irradiated with 4 megarads of electron beam radiation in a $N_2$ atmosphere containing no more than 50 ppm $O_2$.

The resulting magnetic medium showed a squareness of 0.716 and a coercivity of 1549 and a remanence of 1683 gauss. All bulk magnetic measurements were made with a vibrating sample magnetometer ("VSM") at 12.3 KOe.

EXAMPLE 20

All of the weights given in this Example are based on 11.02 lbs (5.00 kg) of metal particle pigment being present in the coating formulation. In practice, however, some dispersion may be lost during the various processing steps. If this happens, the weights of the ingredients given in this example must be adjusted in practice to account for the amount of lost metal particle pigment.

This example describes the use of a self-wetting polyurethane which has pendant allyloxy moieties to provide a polyurethane with radiation curing capabilities.

To carry out this Example, 6 g of propyl gallate, 6 g of IRGAFOS 168™, 5.19 lbs (2.35 kg) of 39% solution of Sample 1A copolymer in MEK, and 1.71 lbs (0.80 kg) of 39.7% solution of Sample 7A polyurethane in MEK were sequentially added to 5.4 lbs of methylethyl ketone. The resulting solution was mixed in an enclosed high shear mixer for 10 minutes. The mixing apparatus was then purged with $N_2$ gas.

Next, while maintaining the $N_2$ atmosphere, 11.0 lbs (5.0 kg) of Fe metal particle (DOWA™) was added followed by 0.55 lbs (0.25 kg) of alumina (CERALOX 0.4X™). The mixture was then mixed under the $N_2$ atmosphere in a high shear mixer for an additional 2 hours.

Next, 11.95 lbs (5.42 kg) of methylethyl ketone was added to the mixture. The mixture was then mixed with a high shear mixer for an additional hour. The dispersion was thinned down to 39% solids by addition of 0.58 lbs (0.26 kg) of MEK. After this, the mixture was milled pass to pass in a sandmill until smooth using ceramic media.

The magnetic dispersion was coated onto one side of a thin gauge, pre-primed polyester terephthalate substrate bearing a carbon black-containing backside coating on its other side. Just prior to coating the magnetic dispersion onto the substrate, 1.52 lbs (0.69 kg) of 44.7% solution of Sample 6A polyurethane in MEK was added followed by 0.11 lbs (50 g) of butyl stearate. Then, 6.49 lbs (3.15 kg) of methylethyl ketone and 3.21 lbs (1.46 kg) of xylene were added to the dispersion.

After coating the magnetic dispersion onto the substrate, the coated substrate was then passed through 3 magnetic fields (2000, 4000, and 3400 Gauss) to orient the magnetic pigment. After orientation, the coated substrate was again dried in two subsequent ovens at 140° F. and 180° F. The magnetic and backside coatings were calendered followed by irradiation with electron beam radiation (8 megarads) in a $N_2$ atmosphere containing no more than 50 ppm $O_2$.

The resulting magnetic media showed a squareness of 0.717 and a coercivity of 1554 and a remanence of 1745 gauss. All bulk magnetic measurements were made with a vibrating sample magnetometer ("VSM") at 12.3 KOe.

EXAMPLE 21

All of the weights given in this Example are based on 11.02 lbs (5.00 kg) of metal particle pigment being present in the coating formulation. In practice, however, some dispersion may be lost during the various processing steps. If this happens, the weights of the ingredients given in this example must be adjusted in practice to account for the amount of lost metal particle pigment.

6 g of propyl gallate, 6 g of IRGAFOS 168™, 0.44 lbs (0.20 kg) of 50% RHODAFAC BG-510 (Rhone-Poulenc Co.) in MEK, 3.41 lbs (1.55 kg) of 41% solution of Sample 4G copolymer in MEK, 1.13 lbs (0.51 kg) of 41.2% solution of Sample 8H polyurethane in MEK were sequentially added to 6.22 lbs of methyl ethyl ketone. The resulting solution was mixed in an enclosed high shear mixer for 10 minutes. The mixing apparatus was then purged with $N_2$ gas.

Next, 11.02 lbs (5.0 kg) of Fe metal particle (TODA™) followed by 0.55 lbs (0.25 kg) of alumina (Ceralox 0.4x) were added sequentially to the dispersion. The dispersion was mixed under an $N_2$ atmosphere in the high shear mixer for an additional 2 hours.

Next, 9.36 lbs (4.24 kg) of methyl ethyl ketone and 2.05 lbs (0.93 kg) of xylene were added to the mixture. The mixture was then mixed with a high shear mixer for two hours. After mixing, the dispersion was thinned down to 35% solids by adding 4.88 lbs (2.21 kg) of methyl ethyl ketone. The mixture was then milled pass to pass in a sandmill until smooth using ceramic media. After milling, the dispersion was filtered through a Nippon Roki HT50 filter followed by a Nippon Roki HT30 filter.

The magnetic dispersion was then coated onto one side of a polyester substrate bearing a carbon-black containing coating on its other side. Just prior to coating the magnetic dispersion onto the substrate, 1.13 lbs (0.51 kg) of 41.2% solution of Sample 8G polyurethane in MEK was added to the dispersion, followed by addition of a solution of 0.11 lbs (0.05 kg) butyl stearate and 0.22 lbs (0.10 kg) myristic acid in 1.68 lbs (0.764 kg) methyl ethyl ketone. After coating the magnetic dispersion onto the substrate, the coated substrate was then passed through 2 magnetic fields (1200 and 4600 gauss) to orient the magnetic pigment. The coated substrate was then dried in two subsequent ovens at 140° .F and 180° F., and the magnetic and backside coatings were then calendered. The coated substrate was then irradiated with 6.6 megarads of electron beam radiation in a $N_2$ atmosphere containing no more than 50 ppm $O_2$.

The resulting magnetic media showed a squareness of 0.731 and a coercivity of 1503 Oe and a remanence of 2601 gauss. All bulk magnetic measurements were made with a vibrating sample magnetometer ("VSM") at 12.3 KOe.

EXAMPLE 22

Magnetic recording media samples were prepared from the following ingredients in the following amounts:

| INGREDIENTS IN PARTS BY WEIGHT | Sample No. | | | |
|---|---|---|---|---|
| | 22A | 22B | 22C | 22D |
| CHARGE I: | | | | |
| MEK | 25.8 | 25.8 | 27.9 | 27.9 |
| Toluene | 13.6 | 13.8 | 12.1 | 12.3 |
| phosphorylated polyoxyalkyl polyol solution (75% in Toluene) (See U.S. Pat. No. 5,028,483 at col. 5) | 0.8 | — | 0.8 | — |
| EMCOL Phosphate | — | 0.6 | — | 0.6 |
| BASF ™ Chromium dioxide | 28.7 | 28.7 | 28.8 | 28.8 |
| Sample 1A copolymer solution (39.0% in MEK) | 4.5 | 4.5 | 5.6 | 5.6 |
| first polymer solution (40% in MEK) | 3.2 | 3.2 | — | — |
| second polymer solution (41.6% in MEK) | — | — | 2.6 | 2.6 |
| CHARGE II: | | | | |
| first polymer solution (40% in MEK) | 3.2 | 3.2 | — | — |
| second polymer solution (41.6% in MEK) | — | — | 2.6 | 2.6 |
| Myristic Acid | 0.4 | 0.4 | 0.4 | 0.4 |
| Butyl Stearate | 0.6 | 0.6 | 0.6 | 0.6 |
| MEK | 11.6 | 11.6 | 9.2 | 9.2 |
| Toluene | 4.9 | 4.9 | 6.7 | 6.7 |
| CB-601 ™ cross-linking agent (60% in PM Acetate) | 2.7 | 2.7 | 2.7 | 2.7 |

In this table, the second polyurethane was prepared in accordance with Example 1 of U.S. Pat. No. 5,081,213. The first polyurethane was prepared as follows. To a 75 gallon kettle were added 108 kg methyl ethyl ketone, 4.0 kg (0.077 equivalents) neopentyl glycol, 0.45 kg (0,008 equivalents) N-methyl diethanolamine, 0.002 kg phosphoric acid, 2,9 kg (0.064 equivalents) trimethylol propane, 37.5 kg (0.090 equivalents) DURACARB 124 (polycarbonate polyol, PPG Industries). After mixing for 15 minutes, 20.5 kg (0.164 equivalents) diphenylmethane diisocyanate and 0.004 kg dibutyltin dilaurate were added. The reaction was heated at 60° C. for one hour. 1 kg of additional diphenylmethane diisocyanate was added and the reaction was continued at 60° C. for an hour. The final inherent viscosity in tetrahydrofuran was 0.3. The calculated equivalent weights were: 1400 hydroxyl, and 20,000 amino.

To prepare each media sample, the ingredients of the first charge were added in the order listed into an enclosed Shar™ mixer (fitted with a water jacket for cooling) and slowly mixed for 2 hours. Next, the contents of the mixer were milled pass to pass until smooth in a horizontal sandmill using 0.8 to 1.0 mm ceramic media. Except for the crosslinking agent, the ingredients of the second charge were then slowly added in the order listed. Milling then continued until a smooth, homogeneous dispersion was obtained, typically 6–8 passes. The mill was cooled using a cold water jacket during milling. The resulting dispersion was filtered, and the crosslinking was added to the dispersion with mixing using the Shar™ mixer. The dispersion was then coated onto a polyethylene terephthalate film. The magnetic pigment was oriented in a magnetic film during coating. The coated film was dried and calendered.

Electromagnetic properties of the samples were determined, and the results are shown in the following table:

| Property | Sample No. | | | |
|---|---|---|---|---|
| | 22A | 22B | 22C | 22D |
| Coercivity, $H_c$ in oersted, Oe | 749 | 761 | 756 | 757 |
| Squareness | 0.8 | 0.84 | 0.81 | 0.84 |
| Remanence, $B_r$ in gauss | 1349 | 1506 | 1408 | 1411 |
| Roughness, in nm | 10.4 | 11.9 | 11.1 | 10.7 |
| Modulus, GPa @ 20° F. | 7.042 | 10.54 | 9.342 | 14.07 |
| Video Noise, db | 2.4 | 1.7 | 1.6 | 1.9 |
| Audio Noise, db | 0.2 | 0.1 | −0.4 | 0.2 |
| Rf Output, db | 1.1 | 1.1 | 0.5 | 0.8 |
| Color Output, db | −0.8 | −0.4 | −1.0 | −0.8 |

EXAMPLE 23 a. Preparation of quaternary ammonium functional isocyanate:

198 g isophorone diisocyanate and 85.5 g dimethyl ethanolamine were stirred into 160 g MEK contained in a flask equipped with a water-cooled condenser. In about 15 minutes, the temperature shot up to about 70° C. and stayed there for about one hour. The solution was allowed to react completely overnight. Next, a solution of 114 g methyl sulfate in 54 g MEK was slowly added with stirring and cooling, if necessary, to maintain the temperature below 60° C. After all the methyl sulfate was added, the solution was allowed to stand overnight.

b. Preparation of styrene/acrylonitrile/hydroxyethyl methacrylate copolymer.

55 parts by weight styrene, 19 parts by weight acrylonitrile, and 26 parts by weight hydroxyethyl methacrylate were free radically polymerized in the presence of 1% mercaptopropanediol, 0.3 g VAZO-64™ initiator, and sufficient MEK to provide a copolymer solution of 39.9% solids.

c. Functionalization of vinyl copolymer with quaternary ammonium and radiation curable moieties:

The following amounts of the quaternary ammonium functional isocyanate, meta-TMI, and dibutytindilaurate were added to portions of the vinyl copolymer prepared in part (b):

| Ingredient | Sample No. | | | |
|---|---|---|---|---|
| | 23A | 23B | 23C | 23D |
| copolymer solution (39.9% solids)* | 300 g | 300 g | 300 g | 300 g |
| quaternary ammonium functional isocyanate solution (65% solids)* | 0 | 2.2 g | 4.4 g | 6.6 g |
| meta-TMI | 19.2 | 19.2 | 19.2 | 19.2 |
| dibutyltin dilaurate | 6 drops | 6 drops | 6 drops | 6 drops |

*The solvent for each of these solutions was MEK.

d. Preparation of dispersions:

Each of Samples 23A, 23B, 23C and 23D were used to prepare dispersions containing 22 g of each sample diluted with MEK to 45% solids, 40 g SMO III™ magnetic pigment, and 50 g MEK. The ingredients were milled in a Quickie mill for 4 hours using steel media.

EXAMPLE 24

44 parts by weight styrene, 30 parts by weight acrylonitrile, and 26 parts by weight hydroxyethyl methacrylate were free radically polymerized in the presence of 0.3% mercaptopropane diol and sufficient MEK to provide a copolymer solution of 40.5% solids. 600 g of this solution were then reacted with 0.5 g dibutyltindilaurate, 12.5 g of a 65% solids solution of the quaternary ammonium functional isocyanate of Example 24 in MEK, and 13 g MEK. reaction was complete in about 24 hours.

Other embodiments of this invention will be apparent to those skilled in the art from a consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A magnetic recording medium, comprising a magnetic layer provided on a nonmagnetizable substrate, wherein the magnetic layer comprises a magnetic pigment dispersed in a polymeric binder, and wherein the polymeric binder comprises:

(a) a nonhalogenated vinyl copolymer, wherein the vinyl copolymer comprises a plurality of pendant nitrile groups, a plurality of pendant hydroxyl groups, and at least one pendant dispersing group; and (b) a polyurethane polymer, wherein the polyurethane polymer comprises a pendant dispersing group of the formula

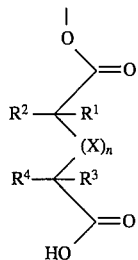

wherein $R^1$, $R^2$, $R^3$, and $R^4$ are independently selected from the group consisting of —H, —OH, —COOM, —SSO$_3$M, —SH, —CH$_2$COOM, —SCH$_2$COOM, —P(=O)(OM)$_2$, —OP(=O)(OM)$_2$, and —Y, wherein at least one of $R^1$, $R^2$, $R^3$, and $R^4$ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, H$^+$ and ammonium cations;

$R^1$ and $R^2$ together or $R^3$ and $R^4$ together can be cis or trans =CHCOOH;

X is a divalent moiety independently selected from the group consisting of —CR$^5$R$^6$ and —NR$^7$;

n represents an integer selected from the group consisting of 0 and 1;

$R^5$ and $R^6$ are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein M and Y are as defined above;

$R^7$ is a monovalent moiety independently selected from the group consisting of —CH$_2$COOH, —CH$_2$CH$_2$COOH, —CH$_2$CH$_2$N(CH$_2$COOH)$_2$, —(CH$_2$)$_6$N(CH$_2$COOH)$_2$, —(CH$_2$CH$_2$O)$_2$CH$_2$CH$_2$N(CH$_2$COOH)$_2$, and —CH$_2$CH$_2$N(CH$_2$COOH)CH$_2$CH$_2$OH.

2. The magnetic recording medium of claim 1, wherein $R^1$, $R^2$, $R^3$, $R^4$, $R^5$, and $R^6$ are independently selected from the group consisting of —H, —OH, —COOM, —SO$_3$M, —SH, —CH$_2$COOM, —SCH$_2$COOM, and —Y.

3. The magnetic recording medium of claim 1, wherein the polyurethane polymer further comprises a pendant radiation curable moiety.

4. The magnetic recording medium of claim 3, wherein the radiation curable moiety of the polyurethane polymer is an allyloxy moiety.

5. The magnetic recording medium of claim 3, wherein the radiation curable moiety of the polyurethane polymer is a (meth)acrylate moiety.

6. The magnetic recording medium of claim 1, wherein the pendant dispersing group of the polyurethane polymer is a half-ester of a dicarboxylic acid selected from citric acid, mercaptosuccinic acid, dimercaptosuccinic acid and mixtures thereof.

7. The magnetic recording medium of claim 6, wherein the pendant dispersing group of the polyurethane is a half-ester of mercaptosuccinic acid.

8. The magnetic recording medium of claim 1, wherein the pendant dispersing group of the vinyl copolymer is selected from the group consisting of quaternary ammonium moiety, amine, salt or acid based on sulfate, salt or acid based on sulfonate, salt or acid based on phosphate, salt or acid based on phosphonate, and salt or acid based on carboxyl.

9. The magnetic recording medium of claim 1, wherein the pendant dispersing group of the vinyl copolymer is a quaternary ammonium moiety.

10. The magnetic recording medium of claim 1, wherein the vinyl copolymer is a copolymer of monomers comprising:

(a) 5 to 40 parts by weight of (meth)acrylonitrile;

(b) 30 to 80 parts by weight of a nonhalogenated, nondispersing, vinyl monomer;

(c) 5 to 30 parts by weight of a nonhalogenated, hydroxyl functional, vinyl monomer; and (d) 0.25 to 10 parts by weight of a nonhalogenated, vinyl monomer bearing a dispersing group.

11. The magnetic recording medium of claim 10, wherein the dispersing group of the nonhalogenated, vinyl monomer bearing a dispersing group is selected from the group consisting of quaternary ammonium moiety, amine moiety, salt or acid moiety based on sulfate, salt or acid based on sulfonate, salt or acid moiety based on phosphate, salt or acid moiety based on phosphonate, and salt or acid moiety based on carboxyl.

12. The magnetic recording medium of claim 10, wherein the dispersing group of the nonhalogenated, vinyl monomer bearing a dispersing group is a quaternary ammonium moiety.

13. The magnetic recording medium of claim 10, wherein the nonhalogenated, vinyl monomer bearing a dispersing group is (meth)acryloyloxyethyl trimethylammonium chloride.

14. The magnetic recording medium of claim 10, wherein the nonhalogenated, nondispersing vinyl monomer is styrene.

15. The magnetic recording medium of claim 14, wherein the dispersing group of the nonhalogenated, vinyl monomer bearing a dispersing group is a quaternary ammonium moiety.

16. The magnetic recording medium of claim 14, wherein the nonhalogenated, vinyl monomer bearing a dispersing group is (meth)acryloyloxyethyl trimethylammonium chloride.

17. The magnetic recording medium of claim 10, wherein the nonhalogenated, nondispersing vinyl monomer is an alkyl ester of (meth)acrylic acid, wherein the alkyl group has 1 to 20 carbon atoms.

18. The magnetic recording medium of claim 17, wherein the alkyl ester of (meth)acrylic acid is methyl methacrylate.

19. The magnetic recording medium of claim 17, wherein the dispersing group of the nonhalogenated, dispersing vinyl monomer is a quaternary ammonium moiety.

20. The magnetic recording medium of claim 17, wherein the nonhalogenated, vinyl monomer bearing a dispersing group is (meth)acryloyloxyethyl trimethylammonium chloride.

21. The magnetic recording medium of claim 21, wherein the monomers of the nonhalogenated vinyl copolymer further comprise an additional nonhalogenated, nondispersing vinyl monomer.

22. The magnetic recording medium of claim 21, wherein the additional nonhalogenated, nondispersing vinyl monomer is an alkyl ester of (meth)acrylic acid, wherein the alkyl group has 1 to 20 carbon atoms.

23. The magnetic recording medium of claim 22, wherein the ratio of styrene to the alkyl ester of (meth)acrylic acid is in the range from 10:90 to 90:10.

24. The magnetic recording medium of claim 22, wherein the alkyl ester of (meth)acrylic acid is methyl methacrylate.

25. The magnetic recording medium of claim 22, wherein the dispersing group of the nonhalogenated, vinyl monomer bearing a dispersing group is a quaternary ammonium moiety.

26. The magnetic recording medium of claim 22, wherein the nonhalogenated, vinyl monomer bearing a dispersing group is (meth)acryloyloxyethyl trimethylammonium chloride.

27. A magnetic recording medium, comprising a magnetic layer provided on a nonmagnetizable substrate, wherein the magnetic layer comprises a magnetic pigment dispersed in a polymeric binder, and wherein the polymeric binder comprises:
 (a) a nonhalogenated vinyl copolymer, wherein the vinyl copolymer comprises a plurality of pendant nitrile groups, a plurality of pendant hydroxyl groups, and at least one pendant dispersing group; and
 (b) a polyurethane polymer having at least one pendant nonhalogenated vinyl copolymeric moiety, said vinyl copolymeric moiety of the polyurethane polymer comprising a plurality of pendant nitrile groups.

28. The magnetic recording medium of claim 27, wherein the vinyl copolymeric moiety of the polyurethane polymer is a copolymer of monomers comprising (meth)acrylonitrile and a nonhalogenated vinyl monomer.

29. The magnetic recording medium of claim 27, wherein the vinyl copolymeric moiety of the polyurethane polymer is a copolymer of monomers comprising (meth)acrylonitrile and styrene.

30. The magnetic recording medium of claim 27, wherein the vinyl copolymeric moiety of the polyurethane polymer is a copolymer of monomers comprising (meth)acrylonitrile and an alkyl ester of (meth)acrylic acid, wherein the alkyl group has 1 to 20 carbon atoms.

31. The magnetic recording medium of claim 30, wherein the alkyl ester of (meth)acrylic acid is methyl methacrylate.

32. The magnetic recording medium of claim 30, wherein the monomers of the vinyl copolymeric moiety further comprise styrene.

33. The magnetic recording medium of claim 27, wherein the dispersing group of the vinyl copolymer is selected from the group consisting of quaternary ammonium moiety, amine, salt or acid based on sulfate, salt or acid based on phosphate, salt or acid based on phosphonate, and salt or acid based on carboxyl.

34. The magnetic recording medium of claim 27, wherein the dispersing group of the vinyl copolymer is a quaternary ammonium moiety.

35. The magnetic recording medium of claim 27, wherein the vinyl copolymer is a copolymer of monomers comprising:
 (a) 5 to 40 parts by weight of (meth)acrylonitrile;
 (b) 30 to 80 parts by weight of a nonhalogenated, nondispersing, vinyl monomer;
 (c) 5 to 30 parts by weight of a nonhalogenated, hydroxyl functional, vinyl monomer; and
 (d) 0.25 to 10 parts by weight of a nonhalogenated, vinyl monomer bearing a dispersing group.

36. The magnetic recording medium of claim 35, wherein the dispersing group of the nonhalogenated, vinyl monomer bearing a dispersing group is selected from the group consisting of quaternary ammonium moiety, amine moiety, salt or acid moiety based on sulfate, salt or acid based on sulfonate, salt or acid moiety based on phosphate, salt or acid moiety based on phosphonate, and salt or acid moiety based on carboxyl.

37. The magnetic recording medium of claim 35, wherein the dispersing group of the nonhalogenated, vinyl monomer bearing a dispersing group is a quaternary ammonium moiety.

38. The magnetic recording medium of claim 35, wherein the nonhalogenated, vinyl monomer bearing a dispersing group is (meth)acryloyloxyethyl trimethylammonium chloride.

39. The magnetic recording medium of claim 35, wherein the nonhalogenated, nondispersing vinyl monomer is styrene.

40. The magnetic recording medium of claim 39, wherein the dispersing group of the nonhalogenated, vinyl monomer bearing a dispersing group is a quaternary ammonium moiety.

41. The magnetic recording medium of claim 39, wherein the nonhalogenated, vinyl monomer bearing a dispersing group is (meth)acryloyloxyethyl trimethylammonium chloride.

42. The magnetic recording medium of claim 35, wherein the nonhalogenated, nondispersing vinyl monomer is an alkyl ester of (meth)acrylic acid, wherein the alkyl group has 1 to 20 carbon atoms.

43. The magnetic recording medium of claim 42, wherein the alkyl ester of (meth)acrylic acid is methyl methacrylate.

44. The magnetic recording medium of claim 42, wherein the dispersing group of the nonhalogenated, dispersing vinyl monomer is a quaternary ammonium moiety.

45. The magnetic recording medium of claim 42, wherein the nonhalogenated, vinyl monomer bearing a dispersing group is (meth)acryloyloxyethyl trimethylammonium chloride.

46. The magnetic recording medium of claim 39, wherein the monomers of the nonhalogenated vinyl copolymer further comprise an additional nonhalogenated, nondispersing vinyl monomer.

47. The magnetic recording medium of claim 46, wherein the additional nonhalogenated, nondispersing vinyl monomer is an alkyl ester of (meth)acrylic acid, wherein the alkyl group has 1 to 20 carbon atoms.

48. The magnetic recording medium of claim 47, wherein the ratio of styrene to the alkyl ester of (meth)acrylic acid is in the range from 10:90 to 90:10.

49. The magnetic recording medium of claim 47, wherein the alkyl ester of (meth)acrylic acid is methyl methacrylate.

50. The magnetic recording medium of claim 47, wherein the dispersing group of the nonhalogenated, vinyl monomer bearing a dispersing group is a quaternary ammonium moiety.

51. The magnetic recording medium of claim 47, wherein the nonhalogenated, vinyl monomer bearing a dispersing group is (meth)acryloyloxyethyl trimethylammonium chloride.

* * * * *

UNITED STATES PATENT AND TRADEMARK OFFICE
CERTIFICATE OF CORRECTION

PATENT NO.: 5,510,187
DATED: April 23, 1996
INVENTOR(S): Kumar et al.

It is certified that error appears in the above-identified patent and that said Letters Patent is hereby corrected as shown below:

Col. 14, line 23, "o-methyl" should be --α-methyl--.

Col. 14, line 62, "EXAMPLE" should be --EXAMPLE 1--.

Col. 15/16, the table just above "EXAMPLE 2", line Tg under Sample No. 1C, "78°C" should be --80°C-- and the Tg under 1D, "—" should be --78°C--.

Col. 19, line 44, "Preparation" should be --b. Preparation--.

Col. 23/24, first table, under 11F, parts by weight MEK "18" should be --182--.

Col. 23, line 31, "Sample lie" should be --Sample 11E--.

Col. 31, line 39, "2,9 kg" should be --2.9 kg--.

Col. 33, line 46, "—SSO$_3$M," should be ----SO$_3$M,--.

Signed and Sealed this

Thirteenth Day of May, 1997

Attest:

BRUCE LEHMAN

Attesting Officer    Commissioner of Patents and Trademarks